US011652646B2

(12) United States Patent
Ying et al.

(10) Patent No.: US 11,652,646 B2
(45) Date of Patent: May 16, 2023

(54) SYSTEM AND A METHOD FOR SECURING AND DISTRIBUTING KEYS IN A 3GPP SYSTEM

(71) Applicant: HUAWEI TECHNOLOGIES CO., LTD., Shenzhen (CN)

(72) Inventors: Bidi Ying, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 17/119,914

(22) Filed: Dec. 11, 2020

(65) Prior Publication Data
US 2022/0191043 A1 Jun. 16, 2022

(51) Int. Cl.
H04L 9/32 (2006.01)
H04L 9/08 (2006.01)

(52) U.S. Cl.
CPC .......... H04L 9/3263 (2013.01); H04L 9/0825 (2013.01)

(58) Field of Classification Search
CPC .............................. H04L 9/3263; H04L 9/0825
USPC ......................................................... 713/176
See application file for complete search history.

(56) References Cited

U.S. PATENT DOCUMENTS 10,461,940 B2 * 10/2019 Cheng ..................... G06F 21/86
2012/0263298 A1 * 10/2012 Suh ......................... H04W 4/50
380/255
2018/0144347 A1 * 5/2018 Kim ....................... H04L 9/0894
2019/0320320 A1 * 10/2019 Li .............................. H04L 9/40
2020/0145818 A1 * 5/2020 Lee ...................... H04W 12/037
2020/0344603 A1 * 10/2020 Gamishev ........... H04W 12/041
2021/0058785 A1 * 2/2021 Adrangi .................. H04W 4/80

FOREIGN PATENT DOCUMENTS

CN 109981273 A 7/2019
WO 2015023341 A2 2/2015

OTHER PUBLICATIONS

3GPP TS 33.220 V16.0.0 (Sep. 2019), 3rd Generation Partnership Project; Technical Specification Group Services and System Aspects; Generic Authentication Architecture (GAA); Generic Bootstrapping Architecture (GBA) (Release 16), 93 pages.

(Continued)

Primary Examiner — Trong H Nguyen
Assistant Examiner — Moeen Khan

(57) ABSTRACT

Systems and methods for key management. An aspect of the disclosure provides for a key management system including an authenticating function, a key-management function, and at least one function. The system provides for separation of authentications and key-management functions. The authenticating function configured for receiving an authentication request associated with a terminal device (TD), authenticating the request, and sending an authentication response to the at least one function. The key-management function configured for receiving a key request associated with the TD, generating a key according to the key request, and sending the key to the at least one function. The at least one function configured for receiving a request for service, sending, to the authenticating function, the authentication request, and receiving, from the authenticating function, the authenticating response.

18 Claims, 14 Drawing Sheets

(56) References Cited

OTHER PUBLICATIONS

3GPP TS 33.501 V15.5.0 (Jun. 2019), 3rd Generation Partnership Project; Technical Specification Group Services and System Aspects; Security architecture and procedures for 5G system (Release 15), 190 pages.

3GPP TR 33.834 V16.1.0 (Mar. 2019), 3rd Generation Partnership Project; Technical Specification Group Services and System Aspects; Security aspects; Study on Long Term Key Update Procedures (LTKUP) (Release 16), 35 pages.

3GPP TR 33.889 V13.0.0 (Sep. 2015), 3rd Generation Partnership Project; Technical Specification Group Services and System Aspects; Study on security aspects of Machine-Type Communications (MTC) architecture and feature enhancements (Release 13), 25 pages.

3GPP TR 33.834 V16.1.0 (Mar. 2019), 3rd Generation Partnership Project; Technical Specification Group Services and System Aspects; Security aspects; Study on Long Term Key Update Procedures (LTKUP) (Release 16), total 35 pages.

Draft S3-181531, Vodafone, pCR to TR 33.834-updated evaluation of solution #2, 3GPP TSG SA WG3 (Security) Meeting #91, Apr. 16-20, 2018, Belgrade, total 2 pages.

\* cited by examiner

SYSTEM AND A METHOD FOR SECURING AND DISTRIBUTING KEYS IN A 3GPP SYSTEM

CROSS-REFERENCE TO RELATED APPLICATIONS

This is the first application filed for the present invention.

FIELD OF THE INVENTION

The present invention pertains to the field of communication networks, and in particular to systems and methods for key management.

BACKGROUND

Current 3GPP systems provide limited options for maintaining key security, which is based on encryption or integrity from the Packet Data Convergence Protocol (PDCP) layer. However, different types of terminal devices (TD) may have different security requirements, e.g. TDs in non-public networks, such as TDs in the military or government environments may need a higher security requirement than TDs in other environments. Existing methods of security protocols are discussed in Technical Report (TR) version 33.899, which relates to design customization security protocols, e.g. encryption/integrity at slice level and gNB level. However, the current key architectures rely almost entirely on the secrecy of long term secret keys (called Ki in Global System for Mobile Communications (GSM)/General Packet Radio Service (GPRS), K in Long Term Evolution (LTE)/5G) that are stored in a Universal Subscriber Identification Module (USIM)/Subscriber Identification Module (SIM) and home operator. Having knowledge of the USIM Over-The-Air (OTA) update keys may allow an attacker to modify or read aspects of the USIM remotely. Currently, there is no standardized mechanism within 3GPP that enables the secure and expedited update of the 3GPP specified long term keys in both the USIM and home operator. Although TR 33.834 discusses different solutions for updating the keys, during replacing/reissuing of the USIM/Universal Integrated Circuit Card (UICC) and updating in the home operator or OTA, the keys are prone to be exposed.

Currently, 3GPP system designs Multimedia and Broadcast/Multicast Service (MBMS) security architecture based on a Generic Bootstrapping Architecture (GBA). In GBA, a TD and a Broadcast-Multicast Service Centre (BM-SC) establish shared keys that are used to protect the point-to-point communication between the TD and the BM-SC. As noted, this MBMS security architecture relies on GBA, but GBA is inadequate for supporting mobility features (e.g. mobile BM-SCs) and is not flexible for third party services due to authentication proxy (AP)/application servers (AS) interface. Furthermore, in group settings, if a group member is compromised, a new group key needs to be unicasted to legal group members. Unicasting this new group key to legal group members (group key refresh) may require extensive network resource.

Therefore, there is a need for a system and methods for key management that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An aspect of the disclosure provides for a system including an authenticating function, a key-management function, and at least one function. The system provides for enhanced security by separating the authentication and key-management functions, in which separate functions are configured to perform each of these functions. The authenticating function configured for receiving, from the at least one function, an authentication request associated with a terminal device (TD). The authenticating function further configured for authenticating the authentication request associated with the TD. The authenticating function further configured for sending, to the at least one function, an authenticating response. The key-management function configured for receiving a key request associated with the TD. The key-management function further configured for generating a key according to the key request. The key-management function further configured for sending the key to the at least one function. The at least one function configured for receiving a request for service. The at least one function further configured for sending, to the authenticating function, the authentication request. The at least one function configured for receiving, from the authenticating function, the authenticating response. In some embodiments, the key generated by the key-management function includes a master key and one or more corresponding seeds and the key-management function is configured to send the key to the at least one function via the authenticating function. In some embodiments, the authenticating function is further configured for sending, to the key-management function, the key request, the key request requesting for the key for each particular function of at least one function. In some embodiments, the authenticating function is further configured for receiving, from the key-management function, a key response including the key. In some embodiments, the authenticating function is further configured for encrypting the key for said each particular function of the at least one function to obtain an encrypted key using a public key from the particular function that the key is requested for. The system further enhances security by providing secure delivery of one or more re-encrypted keys based on a customized security request. In some embodiments, the authenticating response from the authenticating function to said each particular function of the at least one function includes the encrypted key. In some embodiments, the authenticating function is further configured for encrypting the key for said each particular function of the at least one function using a TD's public key to obtain a second encrypted key. The system further enhances security by providing secure delivery of an encrypted key to the TD. In some embodiments, the authenticating function is further configured for sending, to the TD, the second encrypted key. In some embodiments, the authenticating function is further configured for sending, to the TD via one of the at least one function, the second encrypted key. In some embodiments, the at least one function is further configured for decrypting the encrypted key to obtain the master key and the one or more corresponding seeds. In some embodiments, the at least one function is further configured for generating a root key based on the master key, the one or more corresponding seeds, an identifier of a particular function corresponding to the master key and the one or more corresponding seeds, and a TD temporary ID. The system further enhances security by providing for one or more root keys based on the master key and received seeds. In some embodiments, the at least one function is further configured for sending, to at least one control plane function, the root key for a generation of a session-specific key. In some embodiments, the TD belongs to at least one TD group, and the at least one function is further configured for sending, to the key-management function, the key request requesting for the key, wherein the key is a group key for each TD group that the TD belongs to, and the key request includes a group identifier of the each TD group, a server identifier of at least one server providing the service to the TD and trusted by the at least one function, and a public key of the at least one server. In some embodiments, the key-management function is further configured for encrypting the key using a public key of the key-management function to obtain an encrypted key. The system further enhances security by obtaining an encrypted key based on a public key of the key-management function. In some embodiments, the key-management function is further configured for generating a first parameter according to a private key of the key-management function. In some embodiments, the key-management function is further configured for sending, together with the encrypted key to the at least one function, the first parameter and the group identifier of the each TD group. In some embodiments, the at least one function is further configured for receiving, from the key-management function, the encrypted key, the first parameter and the group identifier of the each TD group. In some embodiments, the at least one function is further configured for generating a second parameter based on the first parameter and a public key of the TD. In some embodiments, the at least one function is further configured for generating a re-encrypting key based on the first parameter and the second parameter. In some embodiments, the at least one function is further configured for re-encrypting the encrypted key based on the re-encrypting key to obtain a re-encrypted key. The system further enhances security by obtaining a re-encrypted key based on the re-encrypting key. In some embodiments, the at least one function is further configured for sending to the TD, in response to the request for service from the TD, a service response including the re-encrypted key, the group identifier of the each TD group and the first parameter. The system further enhances security by secure delivering the re-encrypted key. In some embodiments, the request for service is received by the at least one function from the TD and indicates one or more of: in which aspect security is to be guaranteed, wherein the aspect includes one or more of a slice, a service and an infrastructure, a TD identifier (ID), a TD temporary ID, and a group identifier of one or more TD group that the TD belongs to. The system further enhances security by providing for a customized security preference and encryption at different level. In some embodiments, the at least one function includes one or more of: an infrastructure function configured to provide physical resources for communications associated with the TD within a network, a slice function configured to provide one or more slices for one or more services, and a service function configured to provide services to one or more terminal devices.

Another aspect of the disclosure provides for a method. The method includes receiving, by at least one function, a request for service. The method further includes sending, by the at least one function to an authenticating function, an authentication request. The method further includes receiving, by the authenticating function from the at least one function, the authentication request associated with a terminal device (TD). The method further includes authenticating, by the authenticating function, the authentication request associated with the TD. The method further includes sending, by the authenticating function to the at least one function, an authenticating response. The method further includes receiving, by the at least one function from the authenticating function, the authenticating response. The method further includes receiving, by a key-management function, a key request associated with the TD. The method further includes generating, by the key-management function, a key according to the key request. The method further includes sending, by the key-management function, the key to the at least one function. The method provides for enhanced security by having separate and independent functions performing the authentication and key-management functions. In some embodiments, the key generated by the key-management function includes a master key and one or more corresponding seeds. In some embodiments, the key-management function sends the key to the at least one function via the authenticating function. In some embodiments, the method further includes sending, by the authenticating function to the key-management function, the key request, the key request requesting for the key for each particular function of at the least one function. In some embodiments, the method further includes receiving, by the authenticating function from the key-management function, a key response including the key. In some embodiments, the method further includes encrypting, by the authenticating function, the key for said each particular function of the at least one function to obtain an encrypted key using a public key from the particular function that the key is requested for, wherein the authenticating response from the authenticating function to said each particular function of the at least one function includes the encrypted key. The method further enhances security by providing secure delivery of one or more encrypted keys based on a customized security request. In some embodiments, the method further includes encrypting, by the authenticating function, the key for said each particular function of the at least one function using a TD's public key to obtain a second encrypted key. The method further enhances security by providing secure delivery of an encrypted key to the TD. In some embodiments, the method further includes sending, by the authenticating function to the TD, the second encrypted key. In some embodiments, the method further includes sending, by the authenticating function to the TD via one of the at least one function, the second encrypted key. In some embodiments, the method further includes decrypting, by the at least one function, the encrypted key to obtain the master key and the one or more corresponding seeds. In some embodiments, the method further includes generating, by the at least one function, a root key based on the master key, the one or more corresponding seeds, an identifier of a particular function corresponding to the master key and the one or more corresponding seeds, and a TD temporary ID. The method further enhances security by providing for one or more root keys based on the master key and received seeds. In some embodiments, the method further includes sending, by the at least one function to at least one control plane function, the root key for a generation of a session-specific key. In some embodiments, the TD belongs to at least one TD group. In some embodiments, the method further includes sending, by the at least one function to the key-management function, the key request requesting for the key, wherein the key is a group key for each TD group that the TD belongs to, and the key request includes a group identifier of the each TD group, a server identifier of at least one server providing the service to the TD and trusted by the at least one function, and a public key of the at least one server. In some embodiments, the method further includes encrypting, by the key-management function, the key using a public key of the key-management function to obtain an encrypted key. The method further enhances security by obtaining an encrypted key based on a public key of the key-management function. In some embodiments, the method further includes generating, by the key-management function, a first parameter according to a private key of the key-management function. In some embodiments, the method further includes sending, by the key-management function to the at least one function, together with the encrypted key, the first parameter and the group identifier of the each TD group. In some embodiments, the method further includes receiving, by the at least one function from the key-management function, the encrypted key, the first parameter and the group identifier of the each TD group. In some embodiments, the method further includes generating, by the at least one function, a second parameter based on the first parameter and a public key of the TD. In some embodiments, the method further includes generating, by the at least one function, a re-encrypting key based on the first parameter and the second parameter. In some embodiments, the method further includes re-encrypting, by the at least one function, the encrypted key based on the re-encrypting key to obtain a re-encrypted key. The system further enhances security by obtaining a re-encrypted key based on a re-ecrypting key. In some embodiments, the method further includes sending, by the at least one function to the TD, in response to the request for service from the TD, a service response including the re-encrypted key, the group identifier of the each TD group and the first parameter. The method further enhances security by secure delivering the re-encrypted key. In some embodiments, the request for service is received by the at least one function from the TD and indicates one or more of: in which aspect security is to be guaranteed, wherein the aspect includes one or more of a slice, a service and an infrastructure, a TD identifier (ID), a TD temporary ID, and a group identifier of one or more TD group that the TD belongs to. The method further enhances security by providing for a customized security preference and encryption at different level. In some embodiments, the at least one function includes one or more of: an infrastructure function configured to provide physical resources for communications associated with the TD within a network, a slice function configured to provide one or more slices for one or more services, and a service function configured to provide services to one or more terminal devices.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments provide for a new individual key architecture. The individual key architecture provides for a customized security-level session keys while enhancing security for long term key refresh. The individual key architecture further provides for a separation of functions of key management and key authentication.

Embodiments further provide for a new group key architecture based on proxy re-encryption. The group key architecture provides for a customized security-level group key and an efficient and fast group key refresh method. The group key architecture further provides for a separation of functions of key management, authentication, and group service management.

Accordingly, embodiments provide for an individual key architecture and a group key architecture which allows for a customized security-level confidentiality and integrity system. Embodiments further provide for individual key negotiation process, group key for group TDs establishment process, group key for M2M devices establish process, and group key refresh process. Embodiments further provide for detailed signaling/message designs and flowcharts related to the individual and group key architectures.

As noted above, the current key hierarchy architecture poses a numbers of limitations related to long term key. Current 3GPP systems provide only one option for maintaining key security, which is based on encryption or integrity from PDCP layer. The current key architectures rely almost entirely on the secrecy of long term secret keys that is stored in a USIM/SIM and home operator. Having knowledge of the USIM OTA update keys may allow an attacker to modify or read aspects of the USIM remotely. Currently, there is no standardized mechanism within 3GPP that enables the secure and expedited update of the 3GPP specified long term keys in both the USIM and home operator.

To address the limitations of the current key related security issues, a new key hierarchy architecture may be designed. The new key hierarchy structure may be based on a structure where USIM/UICC does not keep long term keys. Thus, even in the situation that the UISM/UICC is compromised, the session keys will not be exposed.

Figure 1:
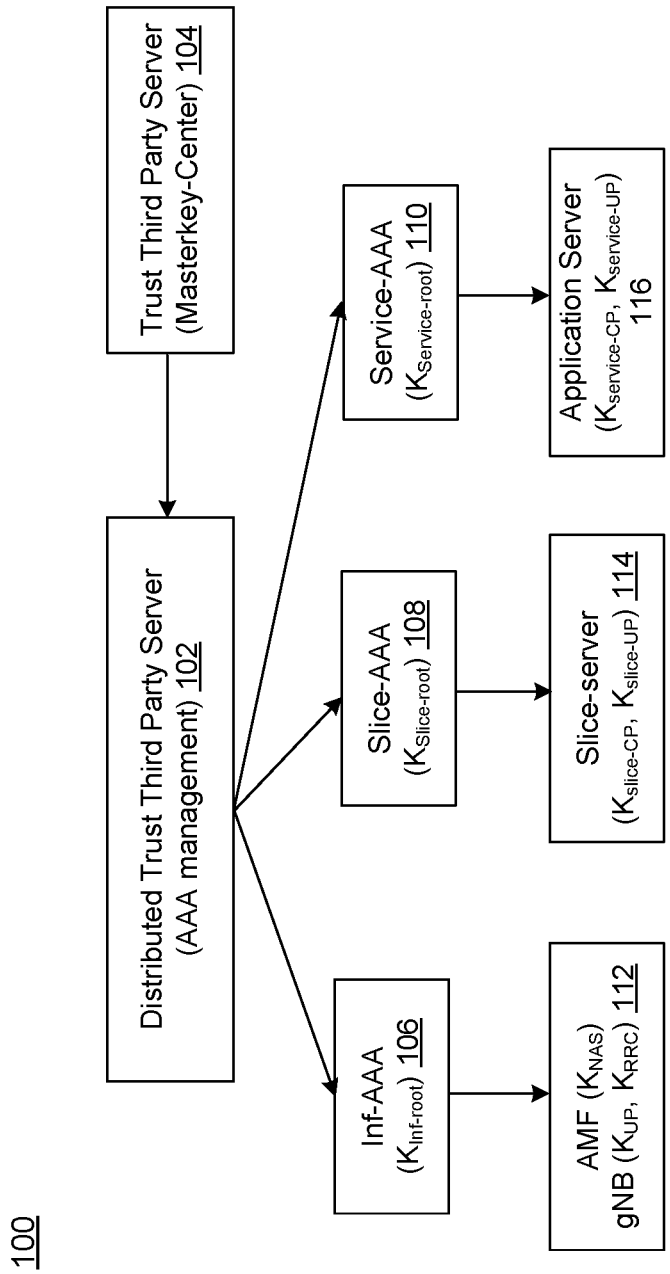
FIG. 1 illustrates an individual key management/hierarchy architecture, according to an embodiment of the present disclosure.

FIG. 1 illustrates an individual key management/hierarchy architecture, according to an embodiment of the present disclosure. The individual key management architecture 100, which may be referred to as individual key architecture 100, presents a key hierarchy that is different from the current 3GPP systems (LTE, 5G), but still has some similarities including separation of Control Plane (CP) keys for NAS messages and User Plane (UP) keys for AS messages.

The individual key architecture 100 provides for a separation of authentication and key management functionalities. The authentication function may be performed by a Distribute Trust Third Party server 102 (e.g. Authentication Authorization and Accounting (AAA) server in a distributed trust third party (e.g. blockchain), also known as AAA management. In this specification reference will be made to AAA management, server or functions, but it should be recognized that not all of three of Authentication Authorization and Accounting need be performed in some embodiments. For example, reference will be made an AAA server, but in some embodiments the accounting operation may not be implemented). The master key generation may be performed by a Trust Third Party server 104 (e.g. master key generation server, or Masterkey-Center). For example, after a TD is successfully authenticated by the Distributed Trust Third Party server 102, the Trust Third Party Server (e.g. Masterkey-Center) 104 generates a master key (e.g. K, CK, IK). It should be noted that keys K, CK, and IK are generated by the Trust Third Party Server 104 and will be delivered securely to the TD using TD's public key. The keys CK and IK are generated for confidentiality and integrity key for backward compatibility.

The individual key architecture 100 provides for slice-level keys or service-level keys for CP messages and UP messages. It should be noted that that slice-level keys for CP/UP messages may be terminated at the slice-server for CP messages or at UP security gateway for UP messages. The service-level keys for CP/UP messages may be terminated at the application controllers for CP messages or application servers for UP messages.

The individual key architecture 100 may comprise a plurality of entities at one or more levels of the hierarchy architecture as illustrated. The individual key architecture may comprise a Distributed Trust Third Party server 102 (e.g. AAA management) and a trust third party server 104 (e.g. Masterkey Center) functioning as independent and separate entities within the architecture. It should be noted that the Distributed Trust Third Party server 102 (e.g. AAA management) and a trust third party server 104 (e.g. Masterkey Center) are each decoupled from the network to which they provide separate functionalities.

The Distributed Trust Third Party server 102 may perform authentication of a TD or entities (e.g. infrastructure (Inf), slice, server). The Distributed Trust Third Party server 102 may further store the authentication materials. The Distributed Trust Third Party server 102 may further secure deliver a master key or seed to the TD, and other entities within the individual key architecture 100, for example, Inf-AAA ($K_{Inf\text{-}root}$) 106, Slice-AAA ($K_{Slice\text{-}root}$) 108 and Service-AAA ($K_{Service\text{-}root}$) 110.

The Trust Third Party server 104 (e.g. Masterkey-Center), which functions independently from the Distributed Trust Third Party server 102 (e.g. AAA management) generates and manages a master key per TD. The Trust Third Party server 104 (e.g. Masterkey-Center) may generate a key, for example a master key (e.g. K, IK, CK). The Trust Third Party server 104 may also generate seeds for different root keys.

The individual key architecture 100 may further comprise authentication server entities or controller entities including AAA server deployed by infrastructure provider (Inf-AAA) 106, AAA server deployed by slice provider (Slice-AAA) 108, and AAA server deployed by service provider (Service-AAA) 110, each responsible for generating and managing a root key, $K_{Inf\text{-}root}$, $K_{Slice\text{-}root}$ and $K_{Service\text{-}root}$, respectively. The authentication server entities or entity controllers 106, 108 and 110 may perform authentication and generation of their root key and are at a layer below the Distributed Trust Third Party server 102 as illustrated.

It should be noted that each entity in the individual key architecture 100 may be referred to as a function. For example, the Distributed Trust Third Party server (e.g., AAA management) 102 may be referred to as an authenticating function, the Trust Third Party server (e.g., Masterkey-Center) 104 may be referred to as a key-management function. Similarly, the Inf-AAA 106 may be referred to as an infrastructure function, which may be configured to provide physical resources for communications within a network. The Slice-AAA 108 may be referred to as a slice function, which may be configured to provide one or more slices for one or more services. And the Service-AAA 110 may be referred to as a service function, which may be configured to provide services to one or more TDs.

The individual key architecture 100 may further comprise one or more entities including Access and Mobility Management Function (AMF), a next generation NodeB referred to as a gNB 112, Slice-server 114, and Application-server 116, for generating and/or managing different levels of session keys. For example, AMF entity may be responsible for generating and/or managing $K_{NAS}$, gNB entity may be responsible for generating and/or managing $K_{UP}$ and $K_{RRC}$, Slice-server may be responsible for generating and/or managing $K_{Slice\text{-}CP}$ and $K_{Slice\text{-}UP}$, and Application-server may be responsible for generating/managing $K_{service\text{-}CP}$ and $K_{Service\text{-}UP}$. Accordingly, the entities 112, 114, and 116 may each generate different levels of a session key.

The individual key architecture 100 may provide for security (including encryption and integrity) at one or more layers. The individual key architecture 100 may provide for link layer (or PDCP layer) encryption or integrity, including one or more keys per cell or gNB and/or one or more keys per infrastructure. The individual key architecture 100 may further provide for slice layer, encryption or integrity, including one or more keys per slice and/or one or more keys per CP or UP. The individual key architecture 100 may further provide for application layer encryption or integrity, including one or more keys per service and/or one or more keys per CP or UP. Depending on a TD's security preference level, the individual key architecture 100 may not provide for an encryption or integrity at any layer.

Figure 2A:
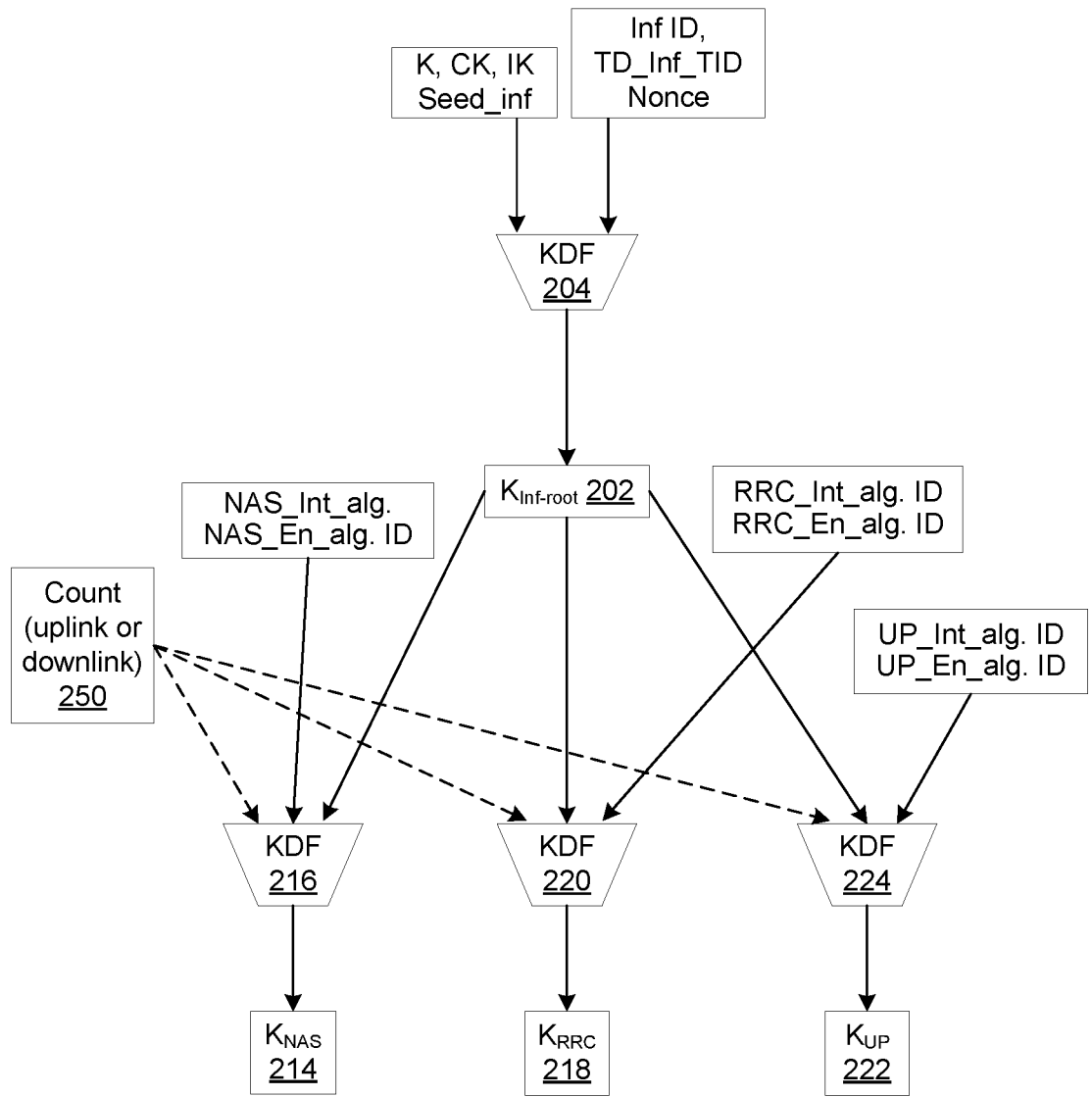
FIG. 2A, FIG. 2B and FIG. 2C illustrate key derivation hierarchy diagrams, according to an embodiment of the present disclosure.
Figure 2B:
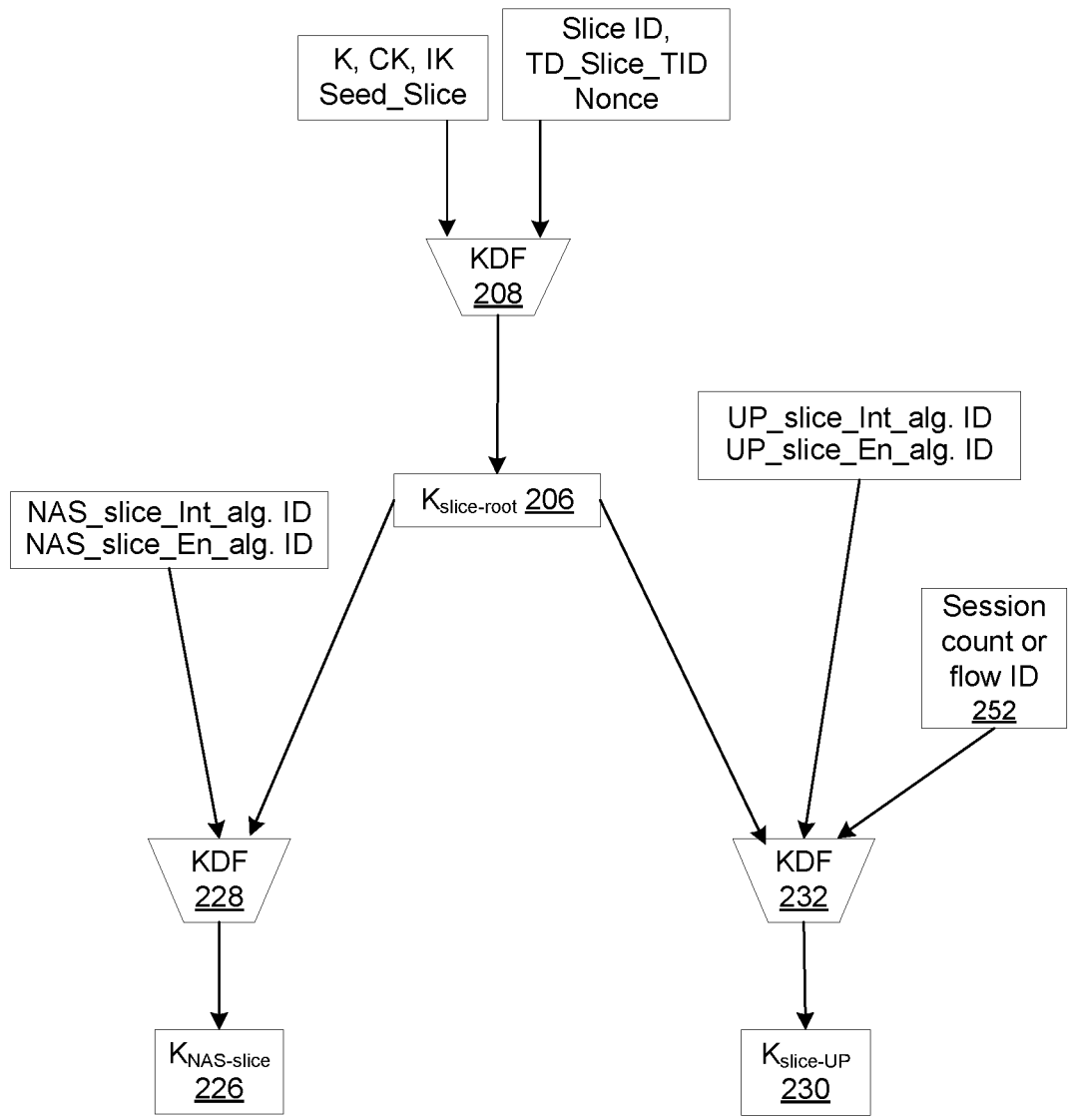
Figure 2C:
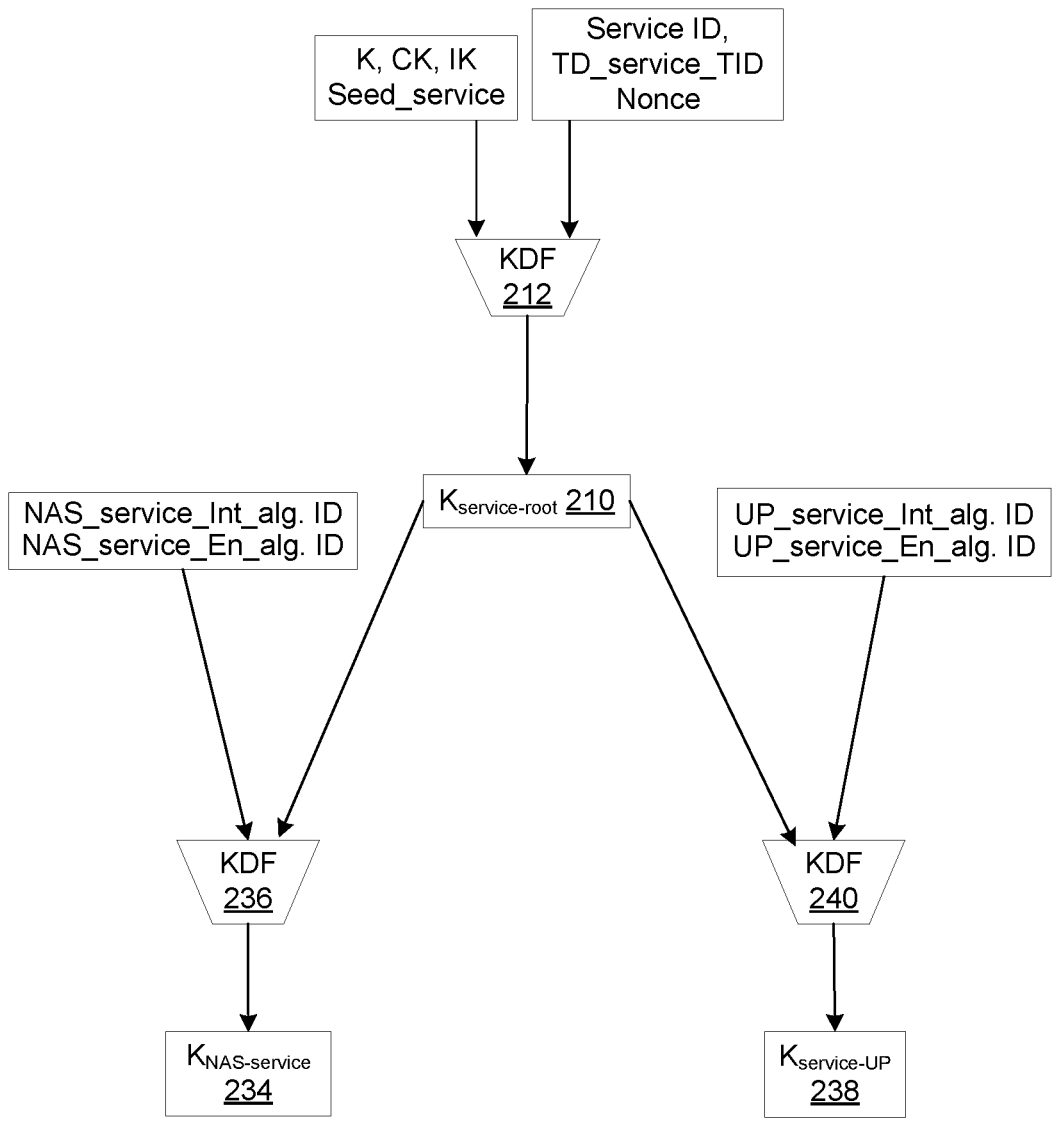

FIG. 2A, FIG. 2B and FIG. 2C illustrate key derivation hierarchy diagrams, according to an embodiment of the present disclosure. Referring to FIG. 1 and FIGS. 2A, 2B and 2C, after the Distributed Trust Third Party server 102

(AAA management) obtains keys K, CK, IK form the Trust Third Party Server 104, the Distributed Trust Third Party server 102 sends the keys to each entity (e.g. Inf-AAA 106, Slice-AAA 108, Service-AAA 110) in a secure communication. Each key may be derived by inputting its upper layer key and parameters into an associated Key Derivation Function (KDF). For example, $K_{Inf-root}$ 202, $K_{Slice-root}$ 206, and $K_{service-root}$ 210 are derived from K, CK, IK, seeds with parameters including entity ID, TD temporary ID or nonce or other parameters related to TD or entity (e.g. entity's public key).

Referring to FIG. 2A, $K_{Inf-root}$ 202 may be derived via its associated KDF 204 from one or more inputs including keys (K, CK, IK) and parameters (Seed_inf, Inf ID, TD_Inf_TID, nonce). In current techniques, key (e.g., K) is assigned or kept to USIM by home operator, which is difficult for update. This key (e.g., K) could bring a risk. Different from current techniques, keys (K, CK, IK) are easy to update with the help of the distributed trust third party. The three keys $K_{NAS}$ 214, $K_{RRC}$ 218 and $K_{UP}$ 222, respectively for NAS message, RRC message and UP data messages, are derived from $K_{Inf-root}$ 202 with parameters of COUNT 250, where COUNT is a value incremented with mobility event in infrastructure or cell or a value incremented with downlinks or uplinks.

The suffix "Int" and "En" may refer to, respectively, integrity and confidentiality protection features of derived keys. The keys may be derived from one or more upper layer key and algorithm ID. For example, $K_{NAS}$ 214 may be derived from, among other inputs, an integrity algorithm with an identifier (ID) NAS_Int_alg. ID and a confidentiality algorithm with an NAS_En_alg. ID. Each algorithm ID may be used to generate a key, associated with the feature of the algorithm. For example, an input of NAS_Int_alg. ID may be used to derive a $K_{NAS}$ 214 having integrity protection. An input of NAS_EN_alg. ID may be used to derive a $K_{NAS}$ 214 having confidentiality protection. Further, both inputs NAS_Int_alg. ID and NAS_En_al. ID may be used to derive two $K_{NAS}$ 214, each $K_{NAS}$ 214 having a protection based on the type of protection algorithm used.

Each entity within the individual key architecture 100 may be configured via network management with lists of algorithms allowed for usage. The lists of algorithms may include one list for integrity algorithms, and one for ciphering algorithms. The selected algorithms may be known to a TD employing the individual key architecture 100.

Referring to FIG. 2A, $K_{NAS}$ 214 may be derived via its associated KDF 216 from one or more of key ($K_{Inf-root}$ 202) and parameters (COUNT, NAS_Int_alg. ID and NAS_En_alg. ID). Note that $K_{Inf-root}$ 202 may replace the current parameter (e.g. $K_{Seaf}$) that is derived from $K_{Ausf}$ which could decouple the relationship about home operator and terminal device.

$K_{RRC}$ 218 may be derived via its associated KDF 220 from one or more of key ($K_{Inf-root}$ 202) and parameters (COUNT, RRC_Int_alg. ID and RRC_En_alg. ID). $K_{UP}$ 222 may be derived via its associated KDF 224 from one or more of key ($K_{Inf-root}$ 202) and parameters (COUNT, UP_Int_alg. ID and UP_En_alg. ID).

Referring to FIG. 2B, $K_{slice-root}$ 206 may be derived via its associated KDF 208 from one or more inputs including keys (K, CK, IK) and parameters (Seed_slice, Slice ID, TD_slice_TID, nonce). $K_{NAS-slice}$ 226, which may be the same as $K_{slice-CP}$, may be derived via its associated KDF 228 from one or more of keys ($K_{slice-root}$ 206) and parameters (NAS_slice_Int_alg. ID and NAS_slice_En_alg. ID). The key for UP data message, $K_{slice-UP}$ 230 may be derived via its associated KDF 232 from one or more keys ($K_{slice-root}$ 206) and parameters (COUNT or flow ID 252, UP_slice_Int_alg. ID and UP_slice_En_alg. ID). The COUNT or flow ID 252, may refer to a value incremented with a PDU session event at slice-level.

Similarly, referring to FIG. 2C, $K_{service-root}$ 210 may be derived via its associated KDF 212 from one or more inputs including keys (K, CK, IK) and parameters (Seed_service, Service ID, TD_service_TID, nonce). $K_{NAS-service}$ 234, which may be the same as $K_{service-CP}$, may be derived via its associated KDF 236 from one or more of key ($K_{service-root}$ 210) and parameters (NAS_service_Int_alg. ID and NAS_service_En_alg. ID). $K_{service-UP}$ 238 may be derived via its associated KDF 240 from one or more of key ($K_{service-root}$ 210) and parameters (UP_service_Int_alg. ID and UP_service_En_alg. ID).

Figure 3:
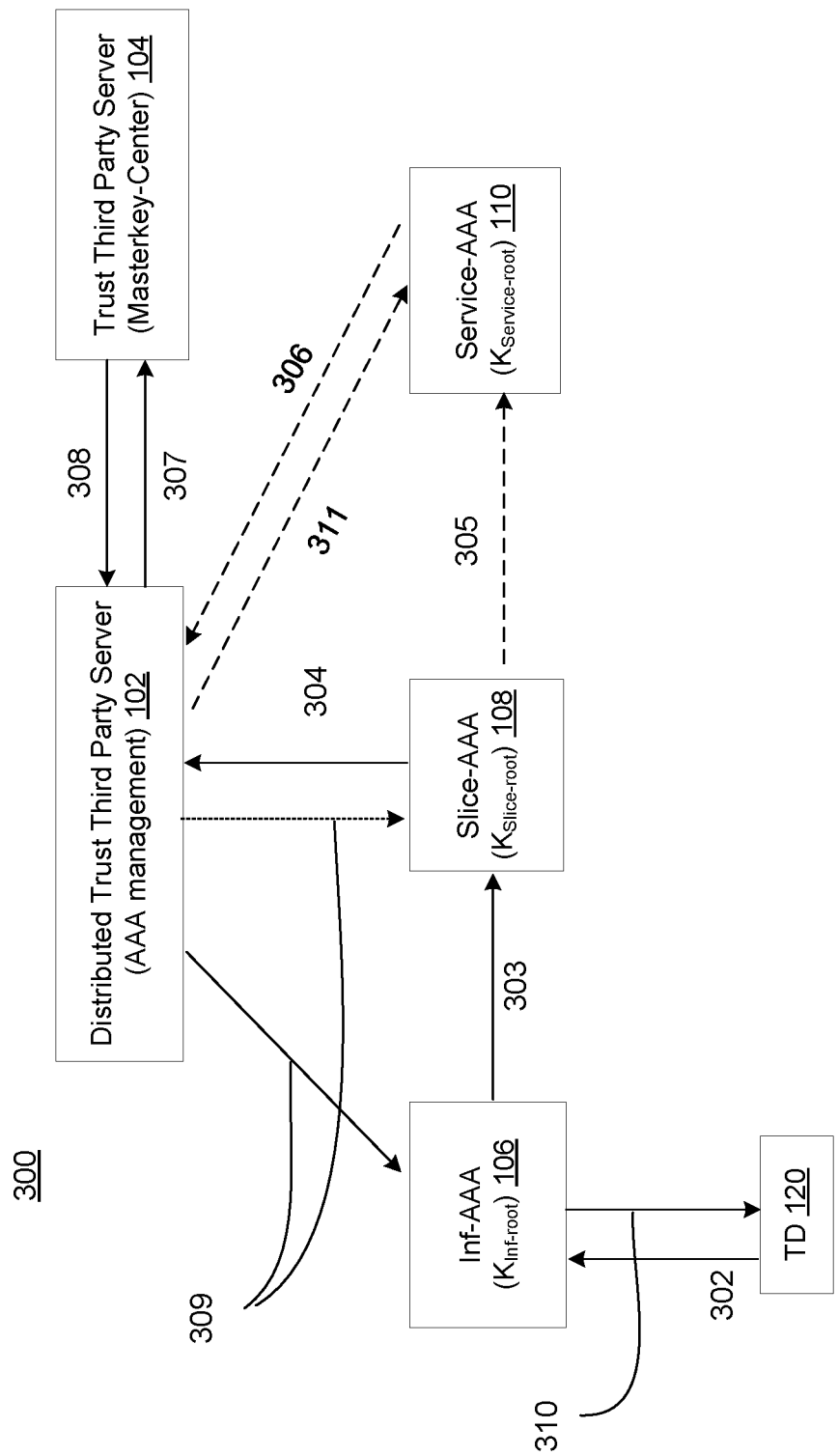
FIG. 3 illustrates a key negotiation procedure, according to an embodiment of the present disclosure.

FIG. 3 illustrates a key negotiation procedure 300, according to an embodiment of the present disclosure. At step 302, TD 120 may send a registration request, PDU session setup request, or a request for session key to Inf-AAA 106. The request may comprise one or more of a TD ID or a TD's temporary ID. In other embodiment, the request may include a security level which may indicate slice-level security, service-level security, or infrastructure-level security, and the corresponding level access authentication requirement.

At step 303, Inf-AAA 106 may forward the request to slice-AAA 108. Then, at step 304, Slice-AAA 108 may then forward the request to the Distributed Trust Third Party (AAA management) server 102 for authentication. In some embodiments, slice-AAA 108 may forward the request to Service-AAA 110, as illustrated in step 305, and the Service-AAA 110 may forward then request to the Distributed Trust Third Party (AAA management) server 102 for authentication as illustrated in step 306. After successfully authenticating TD 120, at step 307, the Distributed Trust Third Party server (AAA management) 102 may send a request to the Trust Third Party (Masterkey Center) 104 for one or more of a master key and a seed. The request at step 307 may comprise a request for master key per TD and a seed per entity (Inf-AAA 106, Slice-AAA 108 or Service-AAA 110). At step 308, the Trust Third Party Server (Masterkey Center) 104 generates and sends a master key including associated parameters (seeds) to the Distributed Trust Third Party server (AAA management) 102.

The Distributed Trust Third Party server (AAA management) 102 may send the master key and associated parameters (seeds) to one or more of: TD 120, Inf-AAA 106, slice-AAA 108 and service-AAA 110, encrypted using each entity's public key, respectively. Step 309 illustrates the Distributed Trust Third Party server (AAA management) 102 sending the master key and the corresponding associated parameters (seeds) to Inf-AAA 106 and slice-AAA 108, encrypted using each entity's public key. Depending on the security level, the Distributed Trust Third Party server (AAA management) 102 may send the master key and its corresponding associated parameter (seed) to service-AAA 110, as illustrated in step 310. The Distributed Trust Third Party server (AAA management) 102 may send the master key and associated parameters (seeds) to TD 120 via Inf-AAA 106 (illustrated at step 311), slice-AAA 108 or service-AAA 110. As explained, the master key and seeds sent to each entity are encrypted using each entity's public key, respectively.

It should be noted that the session key, in the request, refers to a specific TD, for example TD 120. Further, the master key generated by the Trust Third Party Server (Masterkey Center) 104 is per TD, and each generated seed is associated with an entity, per TD (in other words, each seed is per entity per TD).

Referring to FIG. 3, each entity Inf-AAA 106, slice-AAA 108, or service-AAA 110 may then generate its root key based on the master key and seeds.

In some embodiments, session keys may be refreshed to due to security requirements or mobility as further described herein. Mobility may refer to, for example, a handover, in which the session key should then updated (similar to the current 5G system). Security requirements may require the session key to be refreshed when e.g. credentials are compromised or keys are expired. Refreshing a session key may comprise generating a fresh master key by running a successful primary access authentication procedure, or other procedures (e.g. requesting for a new master key periodically).

The individual key hierarchy illustrated in FIGS. 2A, 2B and 2C, based on the individual key architecture 100, allows for direct refreshing of keys at the middle layer entities of the architecture 100, including slice-level, service-level or infrastructure-level. The keys at the middle layer, for example $K_{Inf\text{-}root}$ 202, $K_{slice\text{-}root}$ 206, and $K_{service\text{-}root}$ 210 may be refreshed by one or more of their fresh public key, their fresh identity, their fresh nonce, or TD temporary ID. The ability to directly refresh the keys at the middle layer can reduce overhead of signal message exchanges or complexity when a TD or a device moves from one entity to another entity.

The individual key hierarchy does not allow direct refreshing of keys at the bottom layer, including $K_{NAS}$, $K_{RRC}$, $K_{UP}$, $K_{slice\text{-}CP}$, $K_{slice\text{-}UP}$, $K_{NAS\text{-}slice}$, $K_{service\text{-}CP}$, $K_{service\text{-}UP}$ and $K_{NAS\text{-}service}$. However, these keys are derived by their upper layer keys including $K_{Inf\text{-}root}$ or $K_{slice\text{-}root}$ or $K_{service\text{-}root}$ which can further reduce overhead signal message exchanges or complexity when a TD moves from one cell to another cell.

In some embodiments where a security preference or customization indicates a cell level security protection, then fresh NAS, RRC, and UP keys ($K_{NAS}$, $K_{RRC}$, $K_{UP}$ respectively) may be derived based on certain dynamic parameters (like PCI) or fresh key derivation parameter(s) (like NAS uplink COUNT). Accordingly, fresh NAS, RRC, and UP keys may be generated in each cell. Although fresh keys provides for an enhanced cell protection, refreshing RRC keys and UP keys may increases overhead signaling. A person skilled in the art may appreciate that such a key derivation, for example, based on cell level protection, provides for backward security. For example, a party (e.g. TD) with knowledge of a key, shared with another entity (e.g. infrastructure), is unable to compute any previous key that has been used between the same entity (e.g. TD) and a previous infrastructure, therefore providing backward security.

Figure 4:
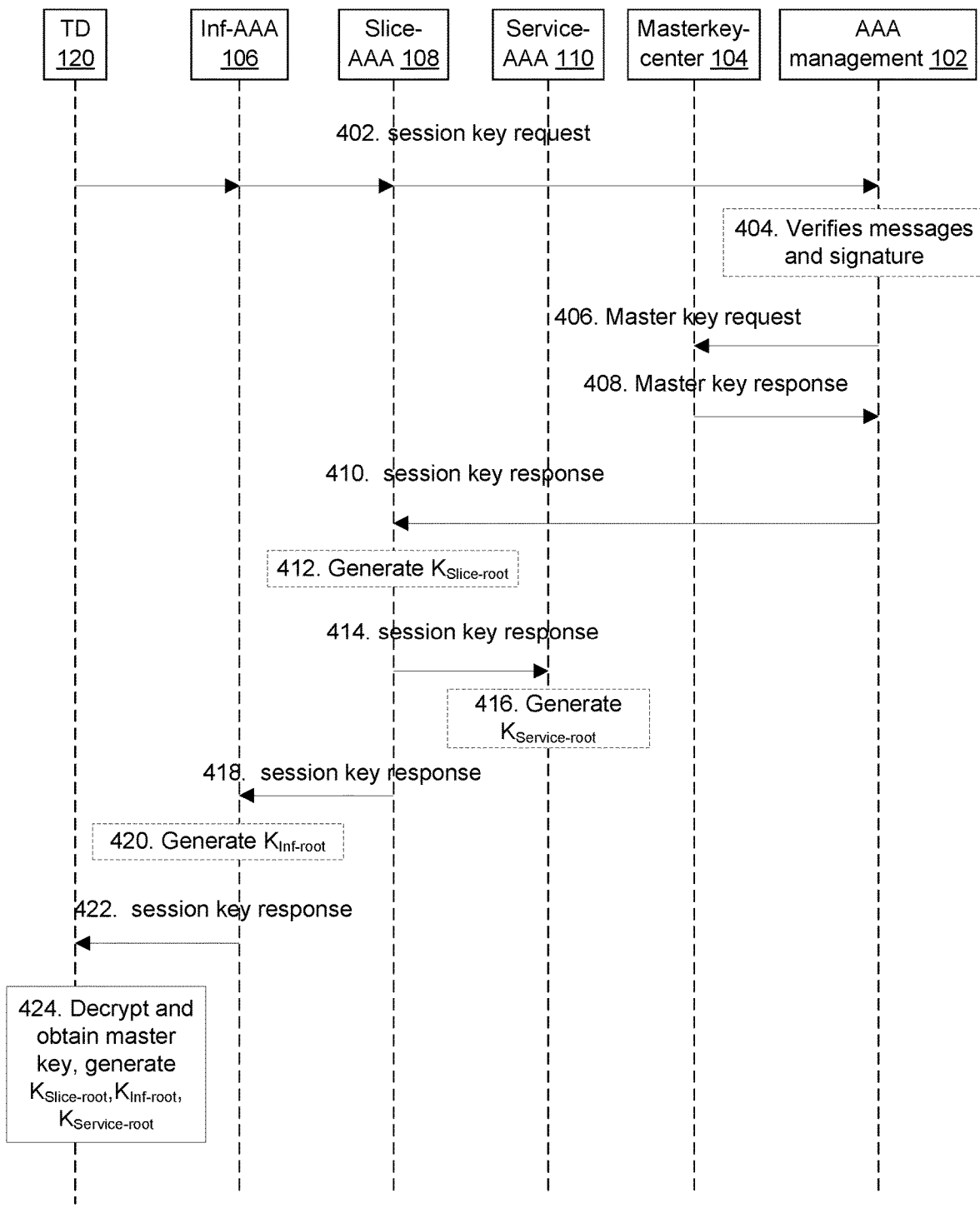
FIG. 4 illustrates a key negotiation procedure, according to an embodiment of the present disclosure.

FIG. 4 illustrates a key negotiation procedure, according to an embodiment of the present disclosure. After a mobile TD, for example TD 120 or a group of TDs is successfully authenticated by the Distributed Trust Third Party server (AAA management) 102, the Distributed Trust Third Party server (AAA management) 102 may send a request to the Trust Third Party Server (e.g. Masterkey-Center) 104 for a master key. The Trust Third Party Server (e.g. Masterkey-Center) 104 may generate and send a master key to the Distributed Trust Third Party server (AAA management) 102. The Distributed Trust Third Party server (AAA management) 102 may secure deliver the master key to the TD 120 and one or more other entity (e.g. Inf-AAA 106, slice-AAA 108, and service-AAA 110). The one or more other entity may generate its session keys for communication with TD 120. A person skilled in the art may appreciate that a mobile TD may have its own security preference or customization which indicates the different levels of security protections or different layer protections.

Levels of security protection may refer to area or domain protection, for example, an infrastructure-level of security may indicate that if a TD moves within a defined range of the infrastructure, the session key will remain unchanged. The different security levels may further include one or more of the link layer (or PDCP layer) encryption or integrity, network layer (or slice layer) encryption or integrity, application layer (end-to-end) encryption or integrity, or none for encryption or integrity. The security protection at link layer may have infrastructure level protection and cell/RAN node level protection.

Layer protection may refer to TCP/IP or OSI model, for example, PDCP layer protection, network layer protection, or application layer protection.

Referring to FIG. 4, at step 402 of the key negotiation procedure 400, the TD 120 sends a session key request to the Distributed Trust Third Party server (AAA management) 102 via Inf-AAA 106 and slice-AAA 108. In some embodiments the session key request may be sent to the Distributed Trust Third Party server (AAA management) 102 via the service-AAA 110. The session key request may include one or more parameters, e.g., TD's temporary IDs or TD ID, security preferences, and the corresponding security level access authentication requirement. TD's temporary IDs or security preference may be encrypted by Distributed Trust Third Party's (AAA management) public key, or an entity's public key. The entity may be TD 120, Inf-AAA 106, slice-AAA 108, and/or service-AAA 110. The session key request may be signed using the entity's private key.

At step 404, after receiving the session key request, the Distributed Trust Third Party server (AAA management) 102 verifies the request and authenticates the TD 120.

At step 406, if the session key request is verified and the TD 120 authenticated, the Distributed Trust Third Party server (AAA management) 102 may send a request to the Trust Third Party Server (Master-center) 104 for a master key. The request for master key may include the TD's temporary ID which is used for communications between the Trust Third Party Server (Masterkey-Center) 104 and the Distributed Trust Third Party server (AAA management) 102.

At step 408, the Trust Third Party Server (Masterkey-Center) 104 may send a master key response to Distributed Trust Third Party server (AAA management) 102. The master key response may include one or more parameters, e.g. TD's temporary ID, TD's master key (e.g. K, CK, IK) and a seed. The master key and the seed may both be encrypted using Distributed Trust Third Party's server (AAA management) 102 public key or a session key between the Trust Third Party Server (Masterkey-Center) 104 and the Distributed Trust Third Party server (AAA management) 102.

At step 410, Distributed Trust Third Party server (AAA management) 102 may sends a signcrypted session key response to slice-AAA 108. The session key response may include one or more parameters, e.g. TD's master key, seed for slice (e.g. seed-slice), TD's temporary ID (e.g. TD_slice_TID), encrypted master key and seeds by TD's public key, encrypted seed_service by service-AAA's public key, and encrypted seed_inf by Inf-AAA's public key.

At step 412, the Slice-AAA 108 verifies the session key response using the Slice-AAA's public key, and decrypts and obtains seed-slice. If the session key response is verified, the slice-AAA 108 generates $K_{slice-root}$.

At 414, the Slice-AAA 108 may send a session key response to service-AAA 110, the session key response may include one or more parameters including TD's temporary IDs, master key, and encrypted seed-service). This session key response is signed using slice-AAA 110's private key At step 416, the Service-AAA 110 verifies the session key response using the public key of Slice-AAA 108. If the session key response is verified, the Service-AAA 110 decrypts and obtains the seed-service, generates $K_{service-root}$ based on seed-service. At 418, the Slice-AAA 108 may send a signcrypted session key response to Inf-AAA 106. The session response at step 418 may include seed_inf and be encrypted, by the Distributed Trust Third Party server (AAA management) 102, using Inf-AAA's public key. At step 420, the Inf-AAA 106 verifies the signcrypted session key response received from Slice-AAA 108. If the signcrypted session key response is verified, the Inf-AAA 106 may generate $K_{Inf-root}$.

At step 422, the Inf-AAA 106 may send a signcrypted session key response to TD 120. The signcrypted session key response may include one or more of TD's temporary ID, encrypted master key, and encrypted seeds.

At step 424, the TD 120 may verify the signcrypted session key response. The TD 120 may decrypt and obtain the master key. The TD may generate $K_{Inf-root}$, $K_{slice-root}$, and $K_{service-root}$ based on seed-Inf, seed-slice, seed-slice, respectively.

As illustrated in embodiments described herein, the individual key architecture 100 provides for different security level encryptions and different level of authentication based on a TD's security customization or preferences. The function of Trust Third Party Server (Masterkey-center) 104 addresses the concerns existing in the current systems the over the long term key update. The individual key architecture 100, including the Trust Third Party Server (Masterkey-center) 104 provide for a convenient and secure way to refresh session keys without modifying keys in USIM remotely.

Currently, 3GPP system designs Multimedia and Broadcast/Multicast Service (MBMS) security architecture based on a Generic Bootstrapping Architecture (GBA). In GBA, a TD and a Broadcast-Multicast Service Centre (BM-SC) use GBA to establish shared keys that are used to protect the point-to-point communication between the TD and the BM-SC. Establishing shared keys is performed through TD authentication and obtaining MBMS Request Key (MRK). The TD authentication is performed by home operator through a Bootstrapping Server Function (BSF) (a function within the GBA (TS 33.220)). The MRK is used for mutual authentication between the TD and the BM-SC and for encrypting session keys (e.g. MBMS Service Key (MSK)). The MRK and MBMS User Key (MUK) are kept in UICC, which is unknown to ME. The BM-SC obtains the MRK and MUK from the BSF. As noted, this MBMS security architecture relies on GBA, but GBA is inadequate for supporting mobility features (e.g. mobile BM-SCs) and is not flexible for third party services due to authentication proxy (AP)/application servers (AS) interface. Furthermore, in group settings, group session keys (e.g. MSK) are encrypted using individual key (e.g. MUK) and are unicasted to group members. Unicasting group session keys to group members, particularly in case of group key refresh, may require extensive network resource.

Figure 5:
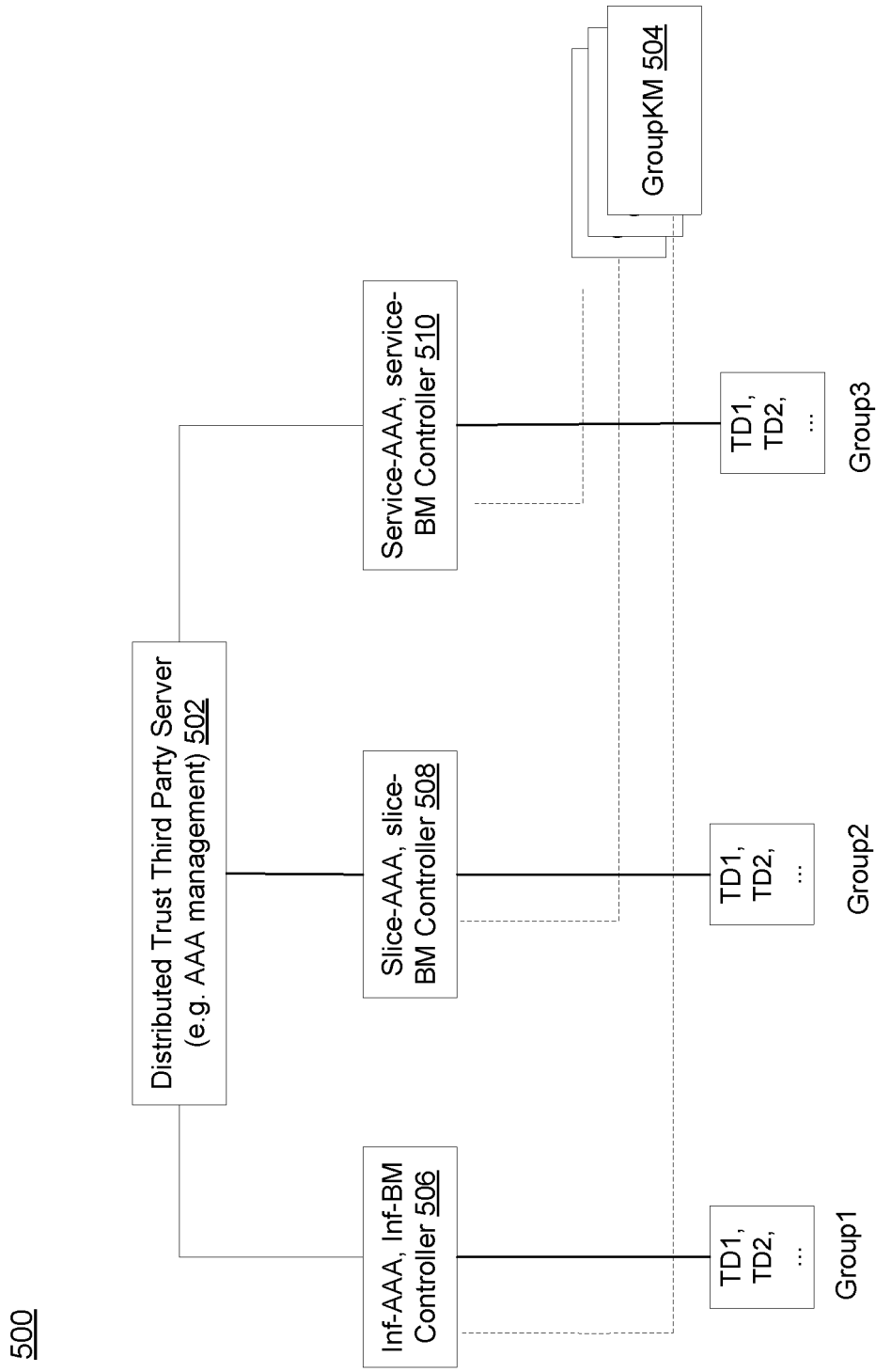
FIG. 5 illustrates a group key architecture, according to an embodiment of the present disclosure.
Figure 6:
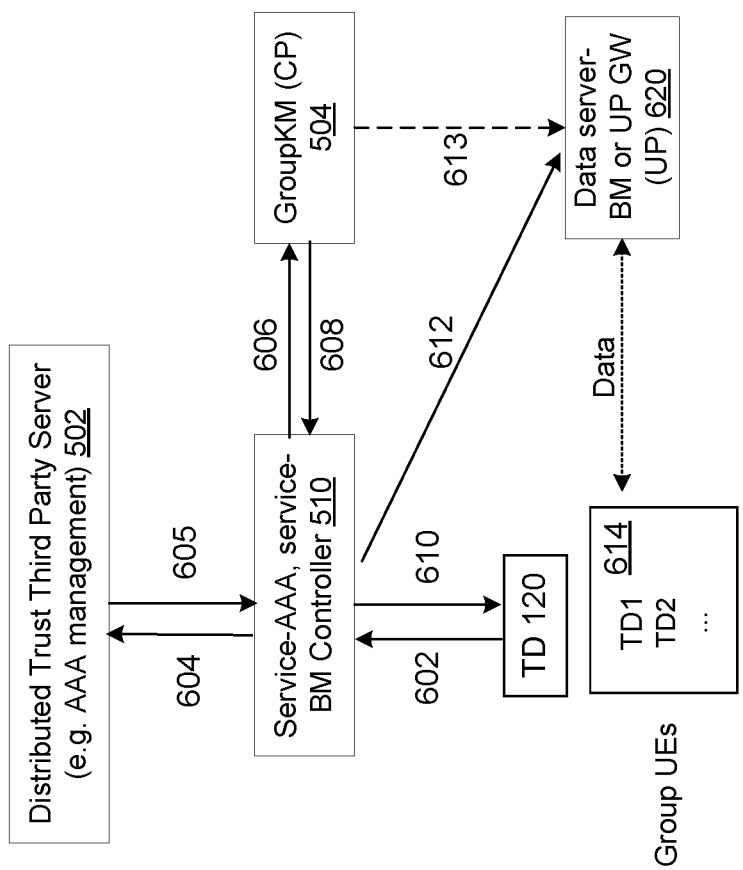
FIG. 6 illustrates a group key architecture at service-level performing a negotiation procedure, according to an embodiment of the present disclosure.

Embodiments provide for a group key architecture, similar to the individual key architecture 100 as described elsewhere herein. FIG. 5 illustrates a group key architecture, according to an embodiment of the present disclosure. The group key architecture 500 may comprise a plurality of entities at different hierarchy levels as illustrated. The group key architecture 500 may comprise a Distributed Trust Third Party Server 502 entity, e.g. AAA management. The Distributed Trust Third Party Server 502 may be similar to the Distributed Trust Third Party Server 102 of FIG. 1. The Distributed Trust Third Party Server 502 may be responsible for authenticating a TD, a group of terminal devices (e.g. UE, or M2M device, or IoT device), or other entities and keeping the authentication materials. The group key architecture 500 may further comprise one or more trust group key management entities, for example, Group key management (GroupKM) entities 504. The GroupKM 504 may perform similar functions as Trust Third Party Server (Masterkey-Center) 104 in addition to other functions as described herein. GroupKM 504 may operate independently and separate from the Distributed Trust Third Party Server 502 and other entities. GroupKM 504 may be deployed in CP layer, in management layer or other one or more layers. For example, in FIG. 6, GroupKM 504 is deployed into the CP layer. In other words, the GroupKM 504 is decoupled from the Distributed Trust Third Party Server 502 and other entities. The GroupKM 504 may be responsible for generating a group key, generating a parameter used for generating a re-encryption key, performing group key refresh, and revoking functionalities. The GroupKM 504 may communicate with other architecture entities, for example, a Data server BM or UP GW (UP) 620 as illustrated in FIG. 6. The GroupKM 504, may directly send a generated group key to Data server BM or UP GW (UP) 620.

The group key architecture 500 may further comprise entities including Inf-AAA or Inf-BM controller 506, slice-AAA or slice-BM controller 508, and service-AAA or service-BM controller 510, each may communicate with the Distributed Trust Third Party Server 502 and be associated with one or more groups of terminal devices. The Inf-AAA or Inf-BM controller 506 may be similar to the Inf-AAA 106 of FIG. 1. The slice-AAA or slice-BM controller 508 may be similar to Slice-AAA 108 of FIG. 1, and the service-AAA or service-BM controller 510 may be similar to Service-AAA 110.

It should be noted that similar to the individual key architecture 100, each entity of the group key architecture 500 may be referred to as a function. For example, the Distributed Trust Third Party server (e.g., AAA management) 502 may be referred to as an authenticating function, the GroupKM 504 may be referred to as a key-management function. The Inf-AAA or Inf-BM controller 506 may be referred to as an infrastructure function, which may be configured to provide physical resources for communications within a network. The slice-AAA or slice-BM controller 508 may be referred to as a slice function, which may be configured to provide one or more slices for one or more services. And the service-AAA or service-BM controller 510 may be referred to as a service function, which may be configured to provide services to one or more TDs.

Each of Inf-AAA or Inf-BM controller 506, slice-AAA or slice-BM controller 508, and service-AAA or service-BM controller 510 may be responsible for generating a re-encryption key, re-encrypting the group key, managing or creating group services. Further, Each of Inf-AAA or Inf-BM controller 506, slice-AAA or slice-BM controller 508, and service-AAA or service-BM controller 510 may be connected and communicate with GroupKM 504, as illustrated. Inf-AAA or Inf-BM controller 506 may be associated with a first TD group, Group 1, slice-AAA or slice-BM controller 508 may be associated with a second TD group, Group 2, and service-AAA or service-BM controller 510 may be associated with a third TD group, Group 3. Each TD group, Group 1, 2 and 3 may comprise one or more TDs, for example, TD1, TD2, etc. Each TD, for example, TD1, TD2, etc. may be a member of Group 1, Group 2, Group 3 or may not be a member of any TD group. In some embodiments, the one or more of the TD groups (Group 1, 2 and 3) may not be present, and may be created upon a request for group services from one or more of TDs (TD1, TD2, etc.).

The group key architecture 500 provides for different level of securities for group services. According to group key architecture 500, after a TD or a TD group member is successfully authenticated by the Distributed Trust Third Party Server (e.g. AAA management) AAA management 502, one or more entities (e.g. Inf-AAA or Inf-BM controller 506, slice-AAA or slice-BM controller 508, or service-AAA or service-BM controller 510) may request a group key for the group service. This group key should be secure delivered to member of group of TDs (e.g. UE, or M2M device, or IoT device).

The group key architecture 500 may provide for different security levels (including encryption and integrity) at one or more levels. The group key architecture 500 provides for security including encryption and integrity at one or more levels. The group key architecture 500 may provide for infrastructure-level encryption or integrity including one or more group keys per group and/or per infrastructure. The group key architecture 500 may further provide for slice-level encryption or integrity, including one or more group key per slice. The group key architecture 500 may further provide for service-level encryption or integrity including one or more group key per service. Depending on a TD group's security preferences, the group key architecture 500 may not provide for security protection, such as encryption or integrity, at any level.

FIG. 6 illustrates a group key architecture at service-level performing a negotiation procedure, according to an embodiment of the present disclosure. The group key architecture may comprise a Distributed Trust Third Party Server 502 entity, e.g. AAA management (CP). The group key architecture may further comprise a GroupKM(CP) 504 entity performing functions as discussed above. The group key architecture may further comprise a Service-AAA or service-BM controller entity 510 for performing functions including authenticating TD group members, generating re-encryption key, re-encrypting group key, managing group service/group member, managing traffic servers (e.g. Data server-BM or UP GW (UP) 620) and delivering group key. The group key architecture may further comprise a Data server-BM or UP GW (UP) 620 entity responsible for the management of group service traffic. The Service-AAA or service-BM controller 510 may communicate with the Distributed Trust Third Party Server 502, GroupKM (CP) 504, Data server-BM or UP GW (UP) 620, and one or more TD group (e.g. TD group 614).

The group key negotiation procedure illustrated in FIG. 6 assumes that the TD group 614 and the service-AAA or service-BM controller 510 have their public/private key for group services. The service-AAA or service-BM controller 510 may also have Data server-BM's or UP GW (UP)'s 620 public key.

Referring to FIG. 6, at step 602, TD 120 sends a request for a BM (broadcast/multicast) service to the service-AAA or service-BM controller 510. The BM service request may be a request to join a group of terminal devices, for example TD group 614. The TD group 614 may comprise members, e.g. TD1, TD2, etc. The BM service request may include one or more of TD ID or TD temporary ID, BM service information, requirements for authentication of BM service server (e.g. Data server-BM or UP GW (UP) 620), or group security preference. In other embodiment, the BM service request may include group security preference.

In some embodiments, the TD group 614 may not be set up when TD 120 sends the BM service request at step 602. After step 602, TD group members, TD1, TD2, etc. may then send a request to join the TD group 614.

At step 604, the service-AAA or service-BM controller 510 may determine the servers for group BM services and send an authentication request to the Distributed Trust Third Party Server 502 e.g. AAA management (CP). The authentication request may include TD ID or TD temporary ID, data server-BM or UP GW (UP) ID or server-AAA ID.

At step 605, the Distributed Trust Third Party Server 502 e.g., AAA management (CP) may send an authentication response to the service-AAA or service-BM controller 510, the response indicating whether authentication was successful.

At step 606, after successfully authenticating the TD and the Data server-BM or UP GW (UP), the service-AAA or service-BM controller 510 may create or maintain a service group ID or group member. The service-AAA or service-BM controller 510 may further request, if it does not already have, a group key for the group service from the GroupKM (CP) 504. The group key request may include one or more of group ID, data server-BM or UP GW (UP) ID, and data server-BM's or UP GW (UP)'s public key.

At step 608, the GrouKM(CP) 504, which is a trusted entity, may generate and encrypt a group key using its public key. The GrouKM(CP) 504 may then send a group key response to the service-AAA or service-BM controller 510. The group key response may include one or more of an encrypted group key and input parameter A used for generating a re-encrypting key (e.g. output of a function with groupKM's private key). Provided that the group key is encrypted, the service-AAA or service-BM controller 510 does not have knowledge of the group key.

At step 610, the service-AAA or service-BM controller 510 may perform functions including generating input parameter B (=KDF (TD's public key, input parameter A, ... )), re-encrypting key (=KDF (input parameter A, input parameter B, ... ), re-encrypting a group key using the re-encrypting key, and sending a BM service response to TD 120. The BM service response may include a re-encrypted group key and input parameter A.

At step 612, the service-AAA or service-BM controller 510 may secure deliver the group key to Data server-BM or UP GW (UP) 620. In other embodiments, the Server-AAA or service-BM controller 510 may generate a re-encryption key using Data server-BM or UP GW (UP)'s public key, input parameter A and input parameter B. After generating the re-encryption key, the Server-AAA or service-BM controller 510 may encrypt the group key using the re-encryption key and sends the re-encrypted group key to the Data server-BM or UP GW (UP) 620.

In some embodiments, at step 613, the GroupKM (CP) 504 encrypts the group key using Data server-BM's or UP GW (UP)'s public key and sends, shown in dotted line, the encrypted group key to Data serve-BM or UP GW (UP) 620.

After receiving the re-encrypted group key, TD 120 may decrypt the re-encrypted group key using its private key. The Data server-BM or UP GW (UP) 620, may also decrypt the re-encrypted group key using its private key. It should be noted that the generated re-encrypting key mentioned at step 610 and/or the generated re-encryption key at step 612 may have parameters, which may include one or more of: Group KM's private key, TD's public key, or Data-server-BM's or UP GW (UP)'s public key. Accordingly, a cipher encrypted using the re-encrypting key or the re-encryption key can be decrypted using TD's private key, or Data-server-BM's or UP GW (UP)'s private key. It may be appreciated that the re-encrypting key or the re-encryption key may be constructed using existing algorithms.

Figure 7:
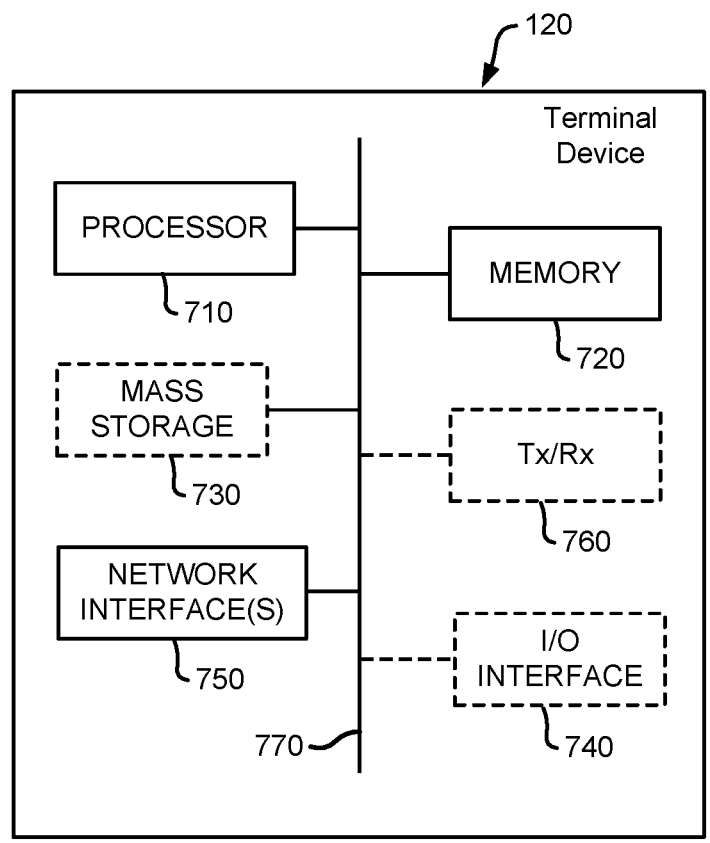
FIG. 7 is a schematic diagram of a user equipment that may perform any or all of operations of the above methods and features explicitly or implicitly described herein, according to different embodiments of the present invention.

FIG. 7 is a schematic diagram of TD 120 that may perform any or all of operations of the above methods and features explicitly or implicitly described herein, according to different embodiments of the present invention. For example, a computer equipped with network function may be configured as TD 120. A TD may refer to a TD, an M2M device, or an IoT device.

As shown, the TD 120 includes a processor 710, such as a Central Processing Unit (CPU) or specialized processors such as a Graphics Processing Unit (GPU) or other such processor unit, memory 720, non-transitory mass storage 730, I/O interface 740, network interface 750, and a transceiver 760, all of which are communicatively coupled via bi-directional bus 770. According to certain embodiments, any or all of the depicted elements may be utilized, or only a subset of the elements. Further, the device 120 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 720 may include any type of non-transitory memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon statements and instructions executable by the processor 710 for performing any of the aforementioned method operations described above.

Figure 8:
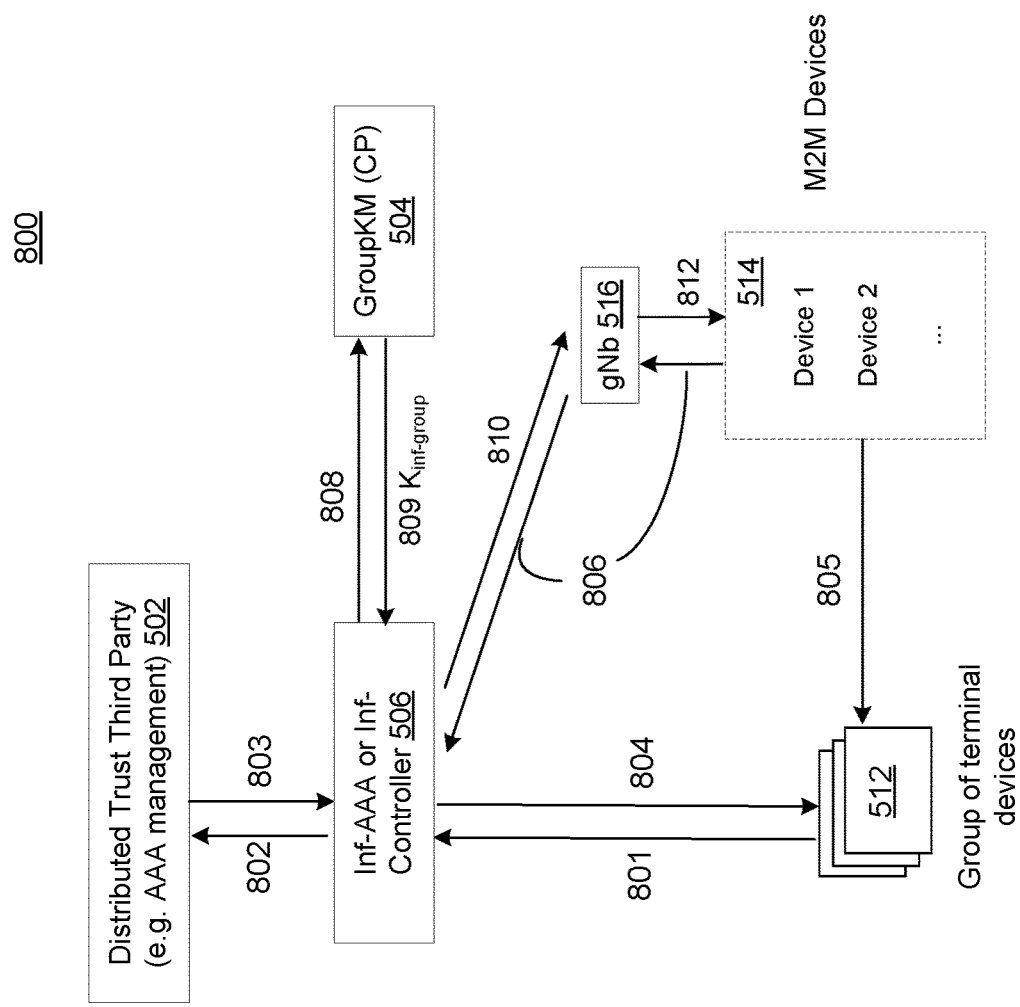
FIG. 8 illustrates a group key negotiation procedure for machine-to-machine (M2M) devices, according to an embodiment of the present disclosure.

FIG. 8 illustrates a group key negotiation procedure for machine-to-machine (M2M) devices, according to an embodiment of the present disclosure. M2M devices 514 (which may also be a TD 120 as discussed herein) may include industrial instrumentation, for example sensors or meters, in which the devices communicate recorded information (such as temperature, humid level, etc.) among each other and other devices. M2M devices 514 may have similar features and/or belong to the same industry (e.g. meter reading company) or belong to a group which have similar services or functions. M2M devices 514 may be located in the same area. The group of these M2M devices 514 may perform the registration and authentication procedure. Each device of the M2M devices 514 is individually authenticated and authorized by the group or the owner 512 of the M2M devices 514. For example, the owner of M2M devices or the group 512 may request a service from the network. The owner or group 512 may be authenticated by the Distributed Trust Third Party Server 502 and obtain an allowed list of infrastructure IDs, an allowed slice ID, a server ID, and a group's temporary ID mapping table. Each device of the M2M devices 514 may then be registered with the group and may be embedded with device's own public and/or private key and group's signature offline. The signature may be signed by group's private key, and the content of the signature may include one or more parameters which may be the device identity, device's public key and an indication of authorization to the device. The allowed list of infrastructure IDs, the allowed slice ID, the server ID, and group's temporary ID mapping table may be securely delivered to or embedded with each of the M2M devices 514. Entities including Inf-AAA 506, slice-AAA 508, service-AAA 510 may have knowledge of the group's public key and group's temporary IDs. All information communicated may be hardware-tampering protected.

Referring to FIG. 8, the group of TD or group 512 may register with the network after being authenticated by the Distributed Trust Third Party Server (e.g. AAA management (CP)) 502. The group 512 may send, at step 801, a registration request to Inf-AAA or Inf-Controller 506. Inf-AAA or Inf-Controller 506 may forward, at step 802, the request to the Distributed Trust Third Party Server (e.g. AAA management (CP)) 502 for authentication. Upon authentication, the Distributed Trust Third Party Server (e.g. AAA management (CP)) 502 may send, at step 803, an authentication response to Inf-AAA or Inf-Controller 506. The Inf-AAA or Inf-Controller 506 may forward, at step 804, the authentication response to the group 512.

At step 805, each of the M2M devices 514 may register with the group 512, after the group 512 authenticate the M2M devices 514. Each of the M2M devices 514 may have its own public and/or private and group's certificate or signature.

At step 806, each of the M2M devices 514 may access the network and may be authenticated by Inf-AAA 506. In this step, each of the M2M devices 514 may send a session key request to Inf-AAA 514 via gNB 516. The session key request may include one or more of a group's temporary ID, a group ID, a device identity, group's signature for authorization to device, device's public key, and security preference.

The Inf-AAA 506 may authenticate the M2M devices 514 through verification of group's signature. The Inf-AAA 506 may send, at step 808, a group-device key request to GroupKM 504. GroupKM 504 may generate a group-device key (e.g. $K_{Inf\text{-}group}$) for the group and send, at step 809, a response to Inf-AAA 506. The response may include the generated group-device key (e.g. $K_{Inf\text{-}group}$).

At step 810, the Inf-AAA or Inf-Controller 506 may send a session key response to the gNB 516. The session key response may include one or more of an infrastructure ID, a group's temporary ID, a device identity, device's public key, and security parameters (e.g., $K_{Inf\text{-}group}$, encryption algorithm ID or integrity algorithm ID).

At step 812, gNB 516 may send a session key response to each of the M2M devices 514. The gNB 516 may send the session key response via unicast or broadcast. In embodiments where only one TD (which includes an M2M device) requests to join a BM-group, then the gNB 516 may unicast the session key response to the TD. In embodiments in which more than one TD requests to join the BM-group, the gNB 516 may broadcast the session key to the TDs requesting to join. It should be noted that all M2M devices 514 have the same group-device key. The gNB 516 may also generate $K_{RRC\text{-}group}$, $K_{UP\text{-}group}$, $K_{NAS\text{-}group}$ based on security preferences. The session key response may include one or more of security parameters (e.g. $K_{Inf\text{-}group}$) encrypted using each TD's public key.

After receiving the response, each of the M2M devices 514 may decrypt the response received and generate $K_{RRC\text{-}group}$, $K_{UP\text{-}group}$, $K_{NAS\text{-}group}$.

Figure 9:
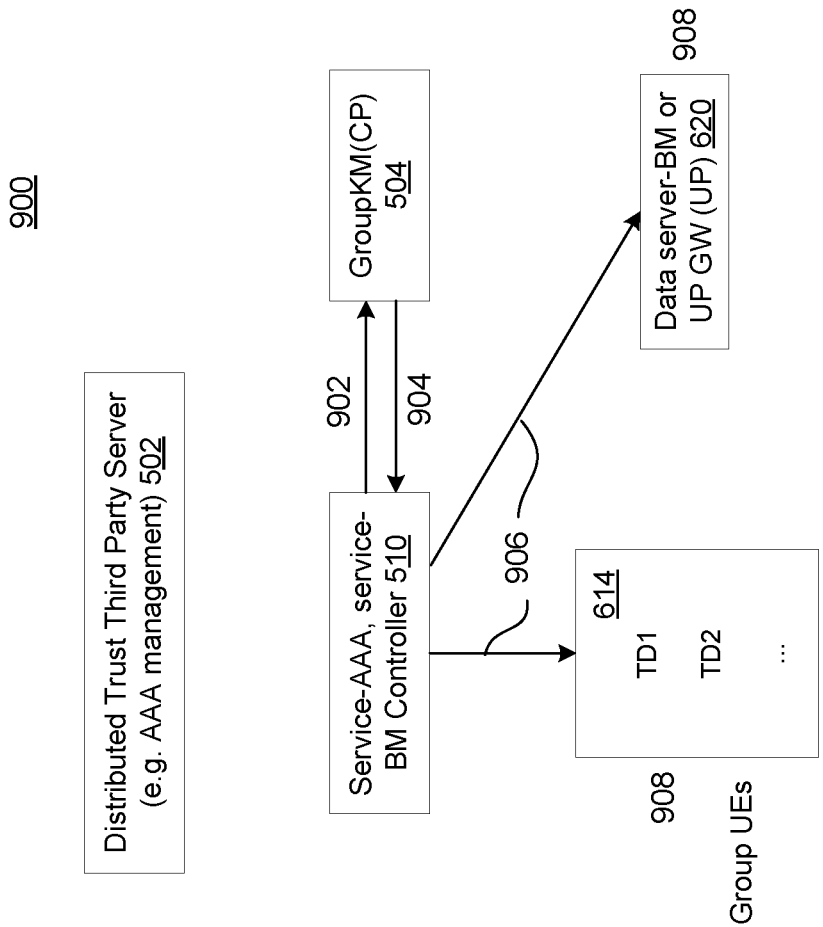
FIG. 9 illustrates a group key refresh procedure according to an embodiment of the present disclosure.

FIG. 9 illustrates a group key refresh procedure according to an embodiment of the present disclosure. At step 902, Service-AAA or service-BM controller 510 may send a request to the trusted GroupKM (CP) 504 to generate a new group key.

The trusted GroupKM 504 encrypts a new group key and sends, at step 904, the encrypted new group key to service-AAA or service-BM controller 510. Service-AAA or service-BM controller 510 may then generate a re-encrypted key and re-encrypt the received encrypted new group key using re-encrypted key. Service-AAA or service-BM controller 510 may further broadcast, at step 906 the re-encrypted new group key to legal TDs of the TD group 614 and Data server-BM or UP GW (UP) 620.

After receiving the broadcasted re-encrypted new group key, Data server-BM or UP GW (UP) 620 and legal TDs of the TD group 614 decrypt the re-encrypted new group key using their own private keys and obtain the new group key.

Figure 10:
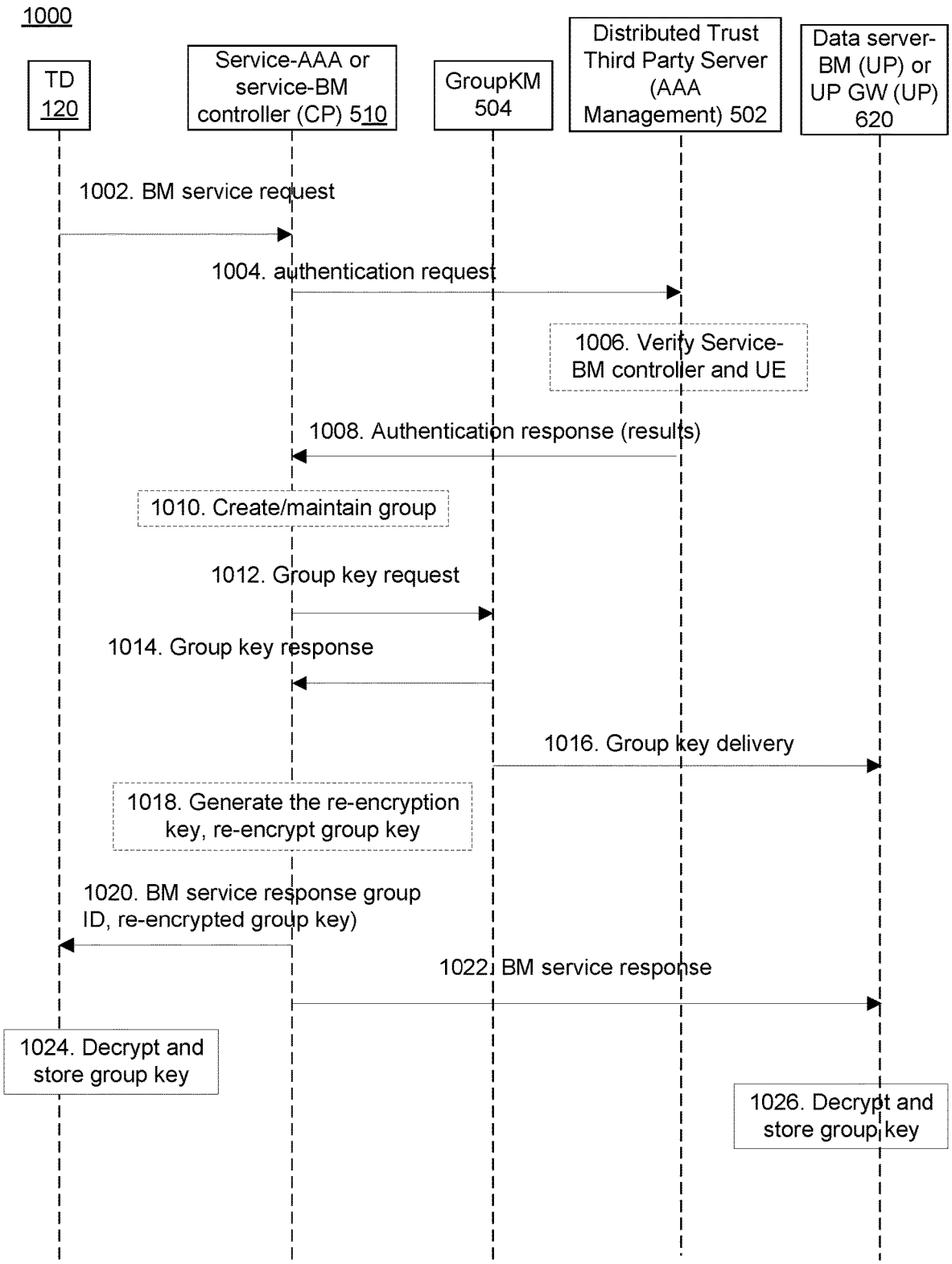
FIG. 10 illustrations a group key negotiation procedure at service-level, according to an embodiment of the present disclosure.

FIG. 10 illustrations a group key negotiation procedure at service-level, according to an embodiment of the present disclosure. The procedure 1000 illustrated in FIG. 10 may be similar to the procedure illustrated in FIG. 6. A TD 120 may join for a group service by sending a BM service request to service-AAA or service-BM controller (CP) 510. If TD 120 is authenticated successfully, service-AAA or service-BM controller (CP) 510 may request for a group key based on security group level preferences.

Referring to FIG. 10, at step 1002, TD 120 may send a BM service request to service-AAA or service-BM controller (CP) 510. The BM service request may include one or more parameters, for example, TD's temporary IDs or TD ID, group service information, security group level preferences, requirements of authentication for Data service-BM (UP) or UP GW (UP) 620. The TD's temporary IDs or security group level preferences may be encrypted by AAA management's (Distributed Trust Third Party) public key. The BM service request may be signed using TD's private key.

At step 1004, Service-AAA or service-BM controller (CP) 510 may send an authentication request to Distributed Trust Third Party Server (AAA management) 502. The authentication request may include one or more parameters, e.g., TD ID or TD's temporary ID, TD's signature, service-AAA ID or service-BM controller ID or Data server-BM or UP GW (UP) ID.

At step 1006, Distributed Trust Third Party Server (AAA management) 502 may authenticate TD 120, service-AAA or service-BM controller (CP) 510 and/or Data server-BM or UP GW (UP) 620.

At step 1008, Distributed Trust Third Party Server (AAA management) 502 may send an authentication response which indicates the results of authentication.

At step 1010, if TD 120 is authenticated, service-AAA or service-BM controller (CP) 510 may create a group or may add the TD 120 into the serving group which the TD 120 wants to join.

At step 1012, Service-AAA or service-BM controller (CP) 510 may send a group key request to a trust GroupKM 504. The group key request may include one or more parameters, e.g., group ID, data server-BM or UP GW (UP) ID with Data server-BM's or UP GW (UP)'s public key.

At step 1014, the trust GroupKM 504 may send a group key response to service-AAA or service-BM controller (CP) 510. The group key response may include one or more parameters, e.g., group ID, group key encrypted using GroupKM's public key, parameter A for generating a re-encryption key, e.g., A may be the output of a function with GroupKM's private key.

Optionally, at step 1016, the trust GroupKM 504 may send a group key and group ID to Data server-BM or UP GW (UP) 620. The group key may be encrypted using Data server-BM's or UP GW (UP)'s public key.

At step 1018, Service-AAA or service-BM controller (CP) 510 may generate a parameter B and re-encryption key. The input parameters for generating the parameter B may include TD's public key and parameter A. The re-encryption key may be the output of a function with parameter A and parameter B. Service-AAA or service-BM controller (CP) may re-encrypts the group key.

At step 1020, Service-AAA or service-BM controller (CP) may sends a group service response to TD 120. The group service response may include one or more parameters, e.g., group ID, re-encrypted group key, etc.

Optionally, at step 1022, Service-AAA or service-BM controller (CP) 510 may send a group service response to Data server-BM or UP GW (UP) 620 if re-encryption key is constructed with Data server-BM's or UP GW (UP)'s public key and parameter A and B.

At step 1024, TD 120 may decrypt the received re-encrypted group key using its private key and store the group key.

At step 1026, if optional step 1022 is performed, Data server-BM or UP GW (UP) 620 may decrypt the received re-encrypted group key using its private key and store the group key.

Figure 11:
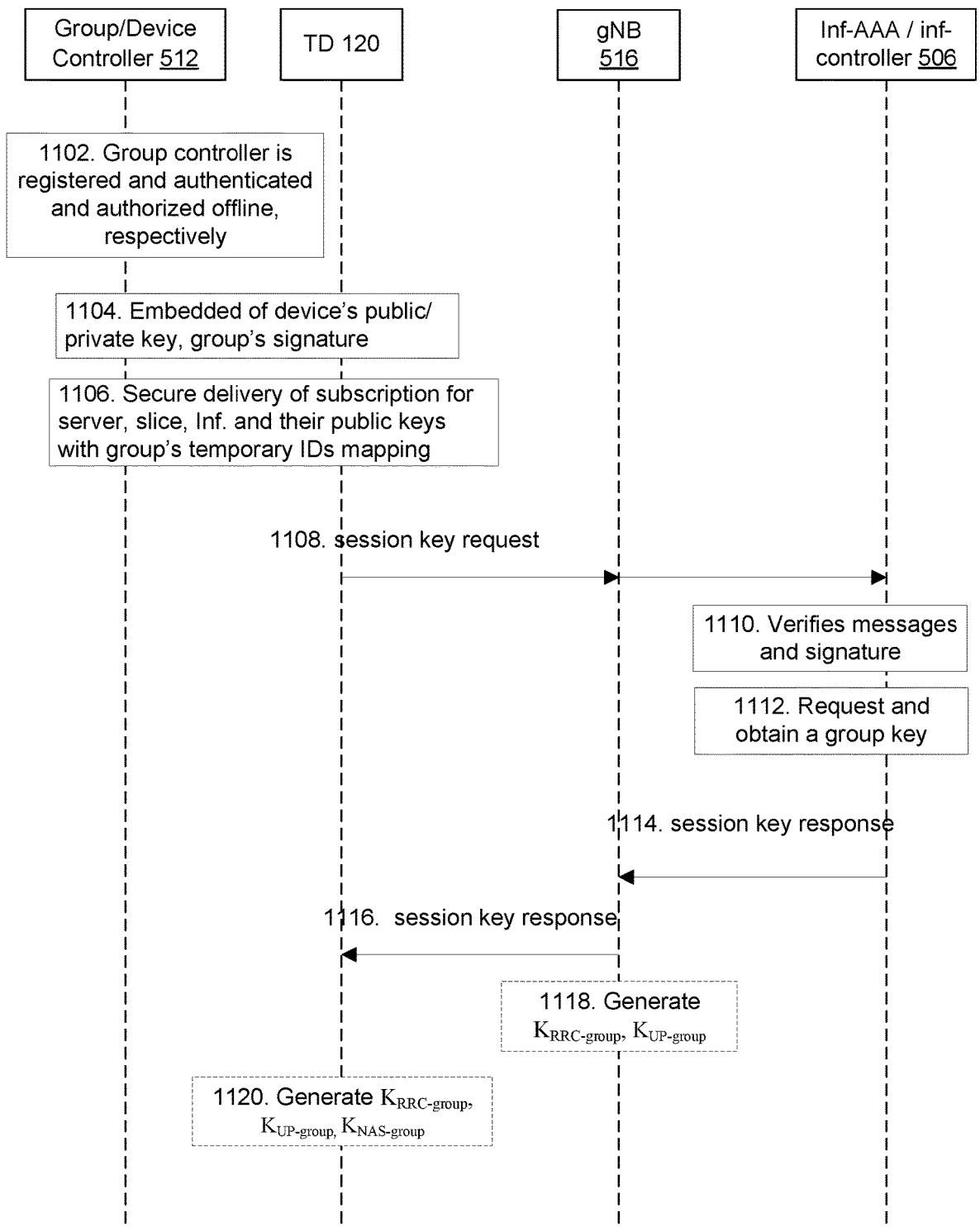
FIG. 11 illustrates a key negotiation procedure for M2M devices, according to an embodiment of the present disclosure.

FIG. 11 illustrates a key negotiation procedure for M2M devices, according to an embodiment of the present disclosure. The procedure 1100 illustrated in FIG. 11 may be similar to the procedure 800 illustrated in FIG. 8. M2M devices may include industrial instrumentation, for example sensors or meters, in which the devices communicate recorded information (such as temperature, humid level, etc.) among each other and other devices. M2M devices may have the similar features and/or belong to the same industry or the seam group (e.g. meter reading company). M2M devices may be located in the same area. The group controller of these M2M devices may perform the registration and authentication procedure. Each of the M2M devices is individually authenticated and authorized by the group controller. For example, the group controller of M2M devices may request a service A from the network.

Referring to FIG. 11, at step 1102, the group/Device controller 512 may be registered, authenticated, and authorized offline, respectively, by the Distributed Trust Third Party. After being authenticated by the Distributed Trust Third Party, the group/Device Controller 512 may obtains an allowed list of infrastructure (e.g. infrastructure A, or infrastructure B), an allowed slice ID, a server ID, and a group's temporary ID mapping table.

At step 1104, each of the M2M devices may then be registered with the group controller and may be embedded with device's own public and/or private key and group/device controller's signature offline. The signature may be signed by group's private key, and the content of the signature may include one or more parameters which may be device identity, device's public key and the indication of authorization to the device.

At step 1106, the allowed list of infrastructure (e.g. infrastructure A, or infrastructure B), the allowed slice ID, the server ID, and the group's temporary ID mapping table may be securely delivered to or embedded with each of the M2M devices.

All information communicated between the entities is hardware-tampering protected. Entities, e.g. Inf-AAA 506, slice-AAA, service-AAA, may have knowledge of the group's public key and group's temporary IDs.

At step 1108, after the group/Device Controller 512 registers with the Distributed Trust Third Party and M2M devices are registered with the group/Device controller 512, TD 120 may send a session key request to Inf-AAA or Inf-controller 506 via gNB 516. The session key request may be encrypted and include one or more parameters which may be group's temporary ID, device identity, group's signature for authorization to device, and device's public key. The session key request may be signed by device's private key.

At step 1110, after receiving the session key request, Inf-AAA or Inf-controller 506 may verify group's signature using group's public key, and may further verify device's signature using device's public key if the session key requested is signed.

At step 1112, Inf-AAA or Inf-controller 506 may request for group key from the trust groupKM, as described elsewhere herein.

At step 1114, Inf-AAA or Inf-controller 506 may send a signencrypted session key response to GNB 516. The signencrypted session key response may include one or more of infrastructure ID, group's temporary ID, device identity, device's public key, and security parameters (e.g., encryption algorithm ID or integrity algorithm ID).

At step 1116, GNB 516 may send the session an encrypted session key response to TD 120. The encrypted session key response may include one or more parameters, e.g., Inf-AAA ID and security parameters encrypted using device's public key.

At step 1118, after receiving the signencrypted session key response at step 1114, gNB 516 may optionally verify the response, and if the response is verified, GNB 516 may generate $K_{RRC\text{-}group}$ and $K_{UP\text{-}group}$.

At step 1120, TD 120 may decrypt the encrypted session key response and generate $K_{RRC\text{-}group}$, $K_{UP\text{-}group}$, and $K_{NAS\text{-}group}$.

Figure 12:
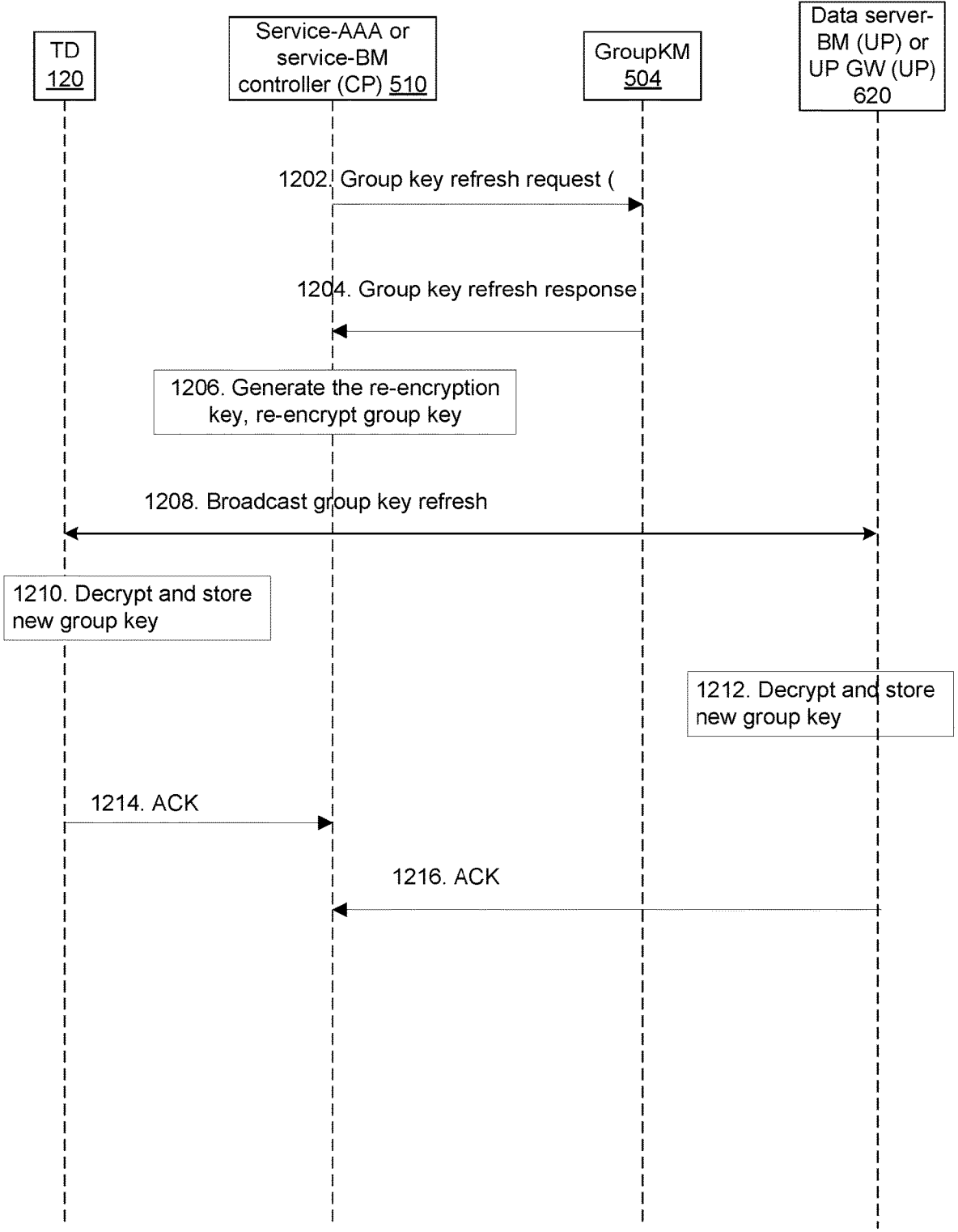
FIG. 12 illustrates a group key refresh procedure, according to an embodiment of the present disclosure.

FIG. 12 illustrates a group key refresh procedure, according to an embodiment of the present disclosure. The procedure 1200 illustrated in FIG. 12 may be similar to the procedure 900 illustrated in FIG. 9.

Referring to FIG. 12, at step 1202, the Service-AAA or service-BM controller (CP) 510 may send a group key refresh request to the trusted GroupKM 504. The group key refresh request may include one or more parameters, e.g., group ID.

At step 1204, the trust GroupKM 504 may generate an input parameter A for generating a new re-encrypting key (e.g. the input parameters A may be an output of a function with GroupKM's private key). The trust GroupKM 504 may send a group key response to service-AAA or service-BM controller (CP) 510. The group key response may include one or more parameters, e.g., group ID, new group key encrypted using GroupKM's public key.

At step 1206, the Service-AAA or service-BM controller (CP) 510 may generates a parameter B and re-encryption key. The input parameters for generating the parameter B may include all legal TDs' public keys, Data server-BM's or UP GW (UP)'s public key, and parameter A. Re-encryption key may be the output of a function with parameter A and parameter B. Service-AAA or service-BM controller (CP) 510 may re-encrypt the group key.

At step 1208, Service-AAA or service-BM controller (CP) 510 may broadcast a group key refresh message. The group key refresh message may include one or more parameters, e.g., group ID, re-encrypted group key, etc.

At step 1210, a legal TD, for example TD 120, that receives the group key refresh message may decrypt the message using its own private key. The TD 120 may then obtain and store the new group key.

At step 1212, other entities that may also receive the group key refresh message, for example Data server-BM or UP GW (UP) 620, may also decrypt the message using its own private keys. The Data server-BM or UP GW (UP) 620 may then obtain and store the new group key.

At step 1214, the legal TD 120 may send an acknowledgement to the Service-AAA or service-BM controller (CP) 510 indicating that the legal TD 120 has obtained the new group key. The acknowledgement may include one or more parameters, e.g. TD ID and TD's temporary ID.

At step 1216, Data server-BM or UP GW (UP) 620 may also send an acknowledgement to the Service-AAA or service-BM controller (CP) 510 indicating that the Data server-BM or UP GW (UP) 620 has obtained the new group key. The acknowledgement may include one or more parameters, e.g. Data server-BM or UP GW (UP) ID.

As illustrated in embodiments described herein, the group key architecture 500 provides for different security level encryptions and different level authentication for TD's security customization. The separation of functions between the GroupKM 504 from Service-BM controller 510 in FIG. 5 and FIG. 6, prevents the Service-BM controller 510 from having knowledge about group key. Having separate entities performing separate functions, e.g. GroupKM entity being a separate and distinct from the Service-BM controller entity and the authentication entity (Distributed Trust Third Party (AAA management)), provides for an enhanced group key security. Further, performing group key refresh via broadcasting re-encryption group keys, rather than unicasting, provides for reduced overhead signaling.

An embodiment of the disclosure provides for a key management system. The key management system may include a distributed trust third party and a master key centre that are decoupled from each other. The distributed third party may be similar to the authenticating function and the master key centre may be similar to the key-management function as described herein. The distributed third party may be configured for receiving a session key request associated with a terminal device (TD). The distributed third party may be further configured for authenticating the TD. The distributed third party may be configured for sending, to the masterkey centre, a request for a master key and at least one seed, each seed associated with one server of at least one server. The distributed third party may be configured for receiving, from the master key centre, the master key and the at least one seed. The distributed third party may be configured for sending, to each server of the at least one server, a session key response including the master key and an associated seed of the at least one seed wherein the master key and the associated seed are encrypted using one or more of the server's public key and TD's public key. The masterkey center may be configured for receiving, from the distributed trust third party, the request for a master key and at least one seed. The masterkey center may be further configured for generating the master key and the at least one seed. The masterkey center may be further configured for sending, to the distributed trust third party, the master key and the at least one seed encrypted using a key associated with the distributed trust third party. In some embodiments, the at least one server may include one or more of an authentication authorization and accounting (AAA) server deployed by a slicer provider; an AAA server deployed by a service provider; and an AAA server deployed by an infrastructure provider. In some embodiments, each server of the at least one server may be configured for generating a root key based on the master key and the associated seed. In some embodiments, each server of the at least one server may be further configured for sending the root key to at least one entity. In some embodiments, each of the at least one entity may be configured for generating a session key based on the root key. In some embodiments, the at least one entity may include one or more of: an access and mobility management function (AMF), a next generation NodeB (gNB), a slice-server, and an application server. In some embodiments, the at least one entity may be a slice-server, in which the session key is further generated based on a value associated with a protocol data unit (PDU) session event in a slice associated with slice-server.

Another embodiment of the present disclosure provides for a method by a distributed trust third party. The method may include the distributed trust third party receiving, from a terminal device (TD) via at least one server, a session key request including one or more of: an indication of security level, an indication of level access authentication requirement, a TD identifier (ID), and a TD temporary ID. The method may further include the distributed trust third party verifying the session key request. The method may further include the distributed trust third party authenticating the TD. The method may further include the distributed trust third party sending, to a masterkey center, a request for a master key and at least one seed. The method may further include the distributed trust third party receiving, from the masterkey center, the master key and the at least one seed, each seed associated with a server of at least one server. The method may further include the distributed trust third party sending, to each server of the at least one server, a session key response including the master key and an associated seed of the at least one seed, wherein the master key and the associated seed encrypted using the server's public key. In some embodiments, the method may further include generating, by each server, a root key based on the master key and the associated seed. In some embodiments, the method may further include sending, by each server, the root key to at least one entity. In some embodiments, the method may further include generating, by the at least one entity, a session key based on the root key. In some embodiments, the session key may be further based on an integration algorithm and a confidentiality algorithm. In some embodiments, the at least one server may include one or more of: an authentication authorization and accounting (AAA) server deployed by a slicer provider; an AAA server deployed by a service provider; and an AAA server deployed by an infrastructure provider. In some embodiments, the at least one entity may include one or more of: an access and mobility management function (AMF), a next generation NodeB (gNB), a slice-server, and an application server. In some embodiments, the entity may be one of an access and mobility management function (AMF) and a next generation NodeB (gNB), in which the session key may further be based on a value associated with at least one of: a mobility event in infrastructure or cell and a downlink or uplink. In some embodiments, the entity may be a slice-server, in which the session key may be further based on a value associated with a protocol data unit (PDU) session event in a slice associated with slice-server.

Another embodiment of the present disclosure provides for a method by a server. The method may include receiving, from a terminal device (TD), a session key request including one or more of: an indication of security level, an indication of level access authentication requirement, a TD identifier (ID), and a TD temporary ID. The method may further include sending, to a distributed trust third party, the session key request for authentication and master key generation. The method may include receiving, from the distributed trust third party, the master key and at least one seed including one seed associated with the server, wherein the master key and the associated seed is encrypted using the server's public key. In some embodiments, the method may further include generating a root key based on the master key and the associated seed. In some embodiments, the method may further include sending an encrypted session key response to a second server for generating a second root key, the session key response including the master key and a second seed of the at least one seed. In some embodiments, the session key response may be encrypted using the second server's public key. In some embodiments, the method may further include sending a second encrypted session key response to a third server for generating a third root key, and the second encrypted session key response may include the master key and a third seed of the at least one seed. In some embodiments, the second session key response may be encrypted using the second server's public key.

Another embodiment of the present disclosure provides for a key management system. The key management system may include a controller and a group key-management center (GroupKM). The group key-management may be similar to the key-management function. The controller may be configured for receiving, from a terminal device (TD), a request for service. The controller may be further configured for sending, to the GroupKM, a request for group key, the request including an identifier (ID) of a TD group and at least one ID of at least one data server associated with the service. The controller may be further configured for receiving, from the GroupKM, a group key response including the group key and a first input parameter for generating a re-encrypting key. The controller may be further configured for sending a service response to the TD, the service response including a re-encrypted group key. The GroupKM may be configured for receiving a request for the group key. The GroupKM may be further configured for generating the group key. The GroupKM may be further configured for encrypting the group key a key associated with the GroupKM. The GroupKM may be further configured for sending, to the controller, the group key response. In some embodiments, the controller may be further configured for sending the service response to the at least one data server associated with the service. In some embodiments, the service may be a broadcast multicast service. In some embodiments, the request for service may further include one or more of: TD identifier (ID), TD temporary ID, group security preference, requirement for authentication for the at least one server. In some embodiments, the controller may be further configured for generating a second input parameter using the first parameter. In some embodiments, the controller may be further configured for generating the re-encrypting key using the first and the second parameters. In some embodiments, the controller may be further configured for re-encrypting the group key using the re-encrypting key. In some embodiments, the controller may be further configured for generating a second re-encrypting key using a key associated with the at least one server. In some embodiments, the controller may be further configured for encrypting the group key using the second re-encryption key. In some embodiments, the controller may be further configured for sending, to the at least one server, the re-encrypted group key that is encrypted using the second re-encrypting key. In some embodiments, the GroupKM may be further configured for encrypting the group key using a key associated with the at least one server. In some embodiments, the GroupKM may be further configured for sending, to the at least one server, the encrypted group key.

Another embodiment of the present disclosure provides for a method by a controller. The method may include receiving, from a terminal device (TD), a request for service. The method may further include sending, to a group key management center (GroupKM), a request for a group key, the request including an identifier (ID) of a TD group and at least one identifier (ID) of at least one data server associated with the service. The method may further include receiving, from the GroupKM, a group key response including the group key encrypted using a key associated with the GroupKM and a first input parameter for generating a re-encrypting key. The method may further include broadcasting a service response to the TD, the service response including a re-encrypted group key and the first parameter. In some embodiments, the service may be a broadcast multicast service. In some embodiments, the request for service may further include one or more of: TD identifier (ID), TD temporary ID, group security preference, requirement for authentication for the at least one server. In some embodiments, the method may further include generating a second input parameter using the first parameter. In some embodiments, the method may further include generating the re-encrypting key using the first and the second parameters. In some embodiments, the method may further include re-encrypting the group key using the re-encrypting key. In some embodiments, the method may further include generating a re-encryption key using a key associated with the at least one server. In some embodiments, the method may further include encrypting the group key using the re-encryption key. In some embodiments, the method may further include sending, to the at least one server, the re-encrypted group key. In some embodiments, the broadcasting a service response to the TD, the service response including a re-encrypted group key and the first parameter may further include broadcasting to the at least one server the re-encrypted group key. In some embodiments, the request for service may be signed using a key associated with the TD. In some embodiments, the method may further include receiving an acknowledgement response from the TD. In some embodiments, the method may further include receiving an acknowledgement response from the at least one server. In some embodiments, the method may further include sending, to a distributed trust third party, an authentication request, including the at least one identifier (ID) of at the least one server associated the service. In some embodiments, the method may further include receiving an authentication response indicating result of the authentication request. In some embodiments, the method may further include creating a TD group associated with the TD. In some embodiments, the method may further include adding the TD to a TD group.

Another embodiment of the present disclosure provides for a method by a controller. The method may include receiving from a terminal device (TD) of a group of TDs, via a radio access network (RAN) node associated with the TD, a session key request including one or more of: an identity of the TD, a security preference, an identifier of a customer associated with the TD, and the customer's signature for the TD's authorization. The method may further include sending, to a group key management center (GroupKM), a request for a group-device key. The method may further include receiving, from the GroupKM, a response including the group-device key. The method may further include sending, to the RAN node, a session key response including one or more of: an identity of the TD, a key associated with the TD, security parameters including group-device key. In some embodiments, the session key request is signed by a private key of the TD. In some embodiments, the method may further includes verifying the customer's signature. In some embodiments, the method may further include verifying a signature associated with the TD.

Another embodiment of the disclosure provides for a method, by a radio access network node associated with a terminal device (TD). The method may include receiving from the TD of a group of TDs, a session key request including one or more of: an identity of the TD, a security preference, an identifier of a customer associated with the TD, and the customer's signature for the TD's authorization. The method may further include sending the session key request to a group key management center (GroupKM). The method may further include receiving, from the GroupKM, a session key response including one or more of: an identity of the TD, a key associated with the TD, security parameters including a group-device key. The method may further include broadcasting the session key response to the TD. In some embodiments, the method may further include generating at least one key based on the security preference. In some embodiments, the session parameters sent to the TD may be encrypted using a key associated with the TD.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A system comprising:
an authenticating function, a key-management function, and at least one additional function, each having one or more associated processors and one or more associated memories, wherein one or more of the associated memories store thereon machine executable instructions which when executed by one or more of the associated processors cause:
the authenticating function to be configured for:
receiving, from the at least one additional function, an authentication request associated with a terminal device (TD);
authenticating the authentication request associated with the TD;
and sending, to the at least one additional function, an authenticating response;
the key-management function to be configured for:
receiving a key request associated with the TD;
generating a key according to the key request; and sending the key to the at least one additional function;
the at least one additional function to be configured for:
receiving a request for service; sending, to the authenticating function, the authentication request;
and receiving, from the authenticating function, the authenticating response;
wherein the TD belongs to at least one TD group and the key is a group key for each TD group to which the TD belongs;
wherein the key-management function is further configured for: encrypting the key using a public key of the key-management function to obtain an encrypted key;
generating a first parameter according to a private key of the key-management function;
and sending, together with the encrypted key to the at least one additional function, the first parameter and a group identifier of each TD group;
and wherein the at least one additional function is further configured for:
receiving, from the key-management function, the encrypted key, the first parameter and the group identifier of each TD group;
generating a second parameter based on the first parameter and a public key of the TD;
generating a re-encrypting key based on the first parameter and the second parameter;
re-encrypting the encrypted key based on the re-encrypting key to obtain a re-encrypted key;
and in response to the request for service from the TD, sending, to the TD, a service response comprising the re-encrypted key, the group identifier of each TD group and the first parameter.

2. The system of claim 1, wherein the key generated by the key-management function includes a master key and one or more corresponding seeds and the key-management function is configured to send the key to the at least one additional function via the authenticating function, wherein the machine executable instructions when executed by one or more of the associated processors cause:
the authenticating function to be further configured for:
sending, to the key-management function, the key request, the key request requesting the key for each particular function of at the least one additional function;
receiving, from the key-management function, a key response comprising the key; and
encrypting the key for said each particular function of the at least one additional function to obtain an encrypted key using a public key from the particular function for which the key is requested.

3. The system of claim 2, wherein the machine executable instructions when executed by one or more of the associated processors cause:
the authenticating function to be further configured for:
encrypting the key for said each particular function of the at least one additional function using a terminal device (TD)'s public key to obtain a second encrypted key; and
sending, to the TD, the second encrypted key.

4. The system of claim 3, wherein the machine executable instructions when executed by one or more of the associated processors cause the authenticating function to be further configured for sending, to the TD via one of the at least one additional function, the second encrypted key.

5. The system of claim 3 wherein the machine executable instructions when executed by one or more of the associated processors cause the at least one additional function to be further configured for:
decrypting the encrypted key to obtain the master key and the one or more corresponding seeds;
generating a root key based on the master key, the one or more corresponding seeds, an identifier of a particular function corresponding to the master key and the one or more corresponding seeds, and a TD temporary ID; and
sending, to at least one control plane function, the root key for a generation of a session-specific key.

6. The system of claim 1 wherein the request for service is received by the at least one additional function from the TD, and indicates one or more of: in which aspect security is to be guaranteed, wherein the aspect includes one or more of a slice, a service and an infrastructure, a TD identifier (ID), a TD temporary ID, and the group identifier of each TD group that the TD belongs to.

7. The system of claim 1 wherein the at least one additional function comprises one or more of: an infrastructure function configured to provide physical resources for communications associated with the TD within a network, a slice function configured to provide one or more slices for one or more services, and a service function configured to provide services to one or more terminal devices.

8. The method according to claim 1, wherein the group key is encrypted using its public key.

9. The method according to claim 1, wherein the key request is a group key request, the group key request including one or more parameters, the one or more parameters including one or more of a group identifier and a public key of the at least one additional function.

10. The method according to claim 1 further comprising, a group key response in response to the key request, wherein the group key response includes one or more parameters, the one or more parameters including one or more of a group identifier and a group key encrypted using its public key.

11. The method according to claim 1, wherein re-encrypting includes re-encrypting the group key.

12. A method performed by an authenticating function, a key-management function, and at least one additional function, the method comprising:
   receiving, by at least one additional function, a request for service;
   sending, by the at least one additional function to an authenticating function, an authentication request;
   receiving, by the authenticating function from the at least one additional function, the authentication request associated with a terminal device (TD);
   authenticating, by the authenticating function, the authentication request associated with the TD: sending, by the authenticating function to the at least one additional function, an authenticating response;
   receiving, by the at least one additional function from the authenticating function, the authenticating response;
   receiving, by a key-management function, a key request associated with the TD:
   generating, by the key-management function, a key according to the key request;
   sending, by the key-management function, the key to the at least one additional function, wherein the TD belongs to at least one TD group and the key is a group key for each TD group to which the TD belongs;
   encrypting, by the key-management function, the key using a public key of the key-management function to obtain an encrypted key;
   generating, by the key-management function, a first parameter according to a private key of the key-management function;
   sending, by the key-management function to the at least one additional function, together with the encrypted key, the first parameter and a group identifier of each TD group;
   receiving, by the at least one additional function from the key-management function, the encrypted key, the first parameter and the group identifier of each TD group;
   generating, by the at least one additional function, a second parameter based on the first parameter and a public key of the TD;
   generating, by the at least one additional function, a re-encrypting key based on the first parameter and the second parameter;
   re-encrypting, by the at least one additional function, the encrypted key based on the re-encrypting key to obtain a re-encrypted key;
   and in response to the request for service from the TD, sending, by the at least one additional function to the TD, a service response comprising the re-encrypted key, the group identifier of each TD group and the first parameter.

13. The method of claim 12, wherein the key generated by the key-management function includes a master key and one or more corresponding seeds;
   the key-management function sends the key to the at least one additional function via the authenticating function;
   and the method further comprises: sending, by the authenticating function to the key-management function, the key request, the key request requesting the key for each particular function of the at least one additional function;
   receiving, by the authenticating function from the key-management function, a key response comprising the key;
   and encrypting, by the authenticating function, the key for said each particular function of the at least one additional function to obtain an encrypted key using a public key from the particular function for which the key is requested.

14. The method of claim 13 further comprising:
   encrypting, by the authenticating function, the key for said each particular function of the at least one additional function using a TD's public key to obtain a second encrypted key; and
   sending, by the authenticating function to the TD, the second encrypted key.

15. The method of claim 14 further comprising: sending, by the authenticating function to the TD via one of the at least one additional function, the second encrypted key.

16. The method of claim 14 further comprising:
   decrypting, by the at least one function, the encrypted key to obtain the master key and the one or more corresponding seeds;
   generating, by the at least one additional function, a root key based on the master key, the one or more corresponding seeds, an identifier of a particular function corresponding to the master key and the one or more corresponding seeds, and a TD temporary ID; and
   sending, by the at least one additional function to at least one control plane function, the root key for a generation of a session-specific key.

17. The method of claim 12, wherein the request for service is received by the at least one function from the TD, and indicates one or more of: in which aspect security is to be guaranteed, wherein the aspect includes one or more of a slice, a service and an infrastructure, a TD identifier (ID), a TD temporary ID, and the group identifier of each TD group that the TD belongs to.

18. The method of claim 12, wherein the at least one additional function comprises one or more of: an infrastructure function configured to provide physical resources for communications associated with the TD within a network, a slice function configured to provide one or more slices for one or more services, and a service function configured to provide services to one or more terminal devices.

\* \* \* \* \*